US010942930B2

(12) United States Patent
Kemme et al.

(10) Patent No.: US 10,942,930 B2
(45) Date of Patent: Mar. 9, 2021

(54) METHODS AND SYSTEMS FOR GRAPH-BASED PUBLICATION-SUBSCRIPTION

(71) Applicant: THE ROYAL INSTITUTION FOR THE ADVANCEMENT OF LEARNING/MCGILL UNIVERSITY, Montreal (CA)

(72) Inventors: Bettina Kemme, Outremont (CA); Joerg Kienzle, Montreal (CA); Cesar Canas Donero, Montreal (CA)

(73) Assignee: THE ROYAL INSTITUTION FOR THE ADVANCEMENT OF LEARNING / MCGILL UNIVERSITY, Montreal (CA)

( * ) Notice: Subject to any disclaimer, the term of this patent is extended or adjusted under 35 U.S.C. 154(b) by 513 days.

(21) Appl. No.: 15/369,277

(22) Filed: Dec. 5, 2016

(65) Prior Publication Data

US 2017/0161282 A1 Jun. 8, 2017

Related U.S. Application Data

(60) Provisional application No. 62/262,416, filed on Dec. 3, 2015.

(51) Int. Cl.
*G06F 16/20* (2019.01)
*G06F 16/2457* (2019.01)
(Continued)

(52) U.S. Cl.
CPC ........ *G06F 16/24578* (2019.01); *G06F 9/542* (2013.01); *G06F 16/9024* (2019.01);
(Continued)

(58) Field of Classification Search
CPC ........... G06F 17/30958; G06F 17/3053; G06F 16/24578; G06F 16/9024; G06F 9/542; H04L 51/16; H04L 51/20
(Continued)

(56) References Cited

U.S. PATENT DOCUMENTS 7,327,741 B1\* 2/2008 Slaughter ................ H04L 12/66
370/255
9,344,751 B1\* 5/2016 Ream .................... H04N 21/242
(Continued)

OTHER PUBLICATIONS

R. Angles and C. Gutierrez. Survey of graph database models. ACM Computing Surveys, 40(1), 2008.
(Continued)

*Primary Examiner* — Vincent F Boccio
(74) *Attorney, Agent, or Firm* — Norton Rose Fulbright Canada LLP

(57) ABSTRACT

A system and method for graph-based publication/subscription are provided. A graph comprising nodes and edges is created, each node representative of a point of interest in an information domain, each edge linking a first node and a second node and representative of a relationship between a first and a second point of interest. A request to publish content on at least one selected node and/or at least one selected edge is received. A request to subscribe to a subset of nodes and/or a subset of edges is received from a subscriber. The subscription request is correlated with the publication request to determine whether the subset of nodes comprises the selected node and whether the subset of edges comprises the selected edge. The content is notified to the subscriber if the subset of nodes comprises the selected node and the subset of edges comprises the selected edge.

20 Claims, 7 Drawing Sheets

(51) Int. Cl.
 H04L 29/08 (2006.01)
 G06F 16/901 (2019.01)
 G06F 9/54 (2006.01)
 H04L 12/58 (2006.01)
(52) U.S. Cl.
 CPC .............. *H04L 67/10* (2013.01); *H04L 51/16* (2013.01); *H04L 51/20* (2013.01)
(58) Field of Classification Search
 USPC ........................................................ 707/749
 See application file for complete search history.

(56) References Cited

U.S. PATENT DOCUMENTS

| | | | | |
|---|---|---|---|---|
| 2005/0015509 | A1* | 1/2005 | Sitaraman | H04L 29/06027 709/231 |
| 2005/0228784 | A1* | 10/2005 | McCauley | G06F 16/43 |
| 2010/0205541 | A1* | 8/2010 | Rapaport | G06Q 10/10 715/753 |
| 2014/0143407 | A1* | 5/2014 | Zhang | H04L 67/00 709/224 |
| 2016/0337464 | A1* | 11/2016 | Eriksson | H04L 67/2842 |

OTHER PUBLICATIONS

R. Barazzutti, T. Heinze, A. Martin, E. Onica, P. Felber, C. Fetzer, Z. Jerzak, M. Pasin, and E. Riviere. Elastic scaling of a high-throughput content-based publish/subscribe engine. In ICDCS, pp. 567{576, 2014.
C. Ca~nas, K. Zhang, B. Kemme, J. Kienzle, and A. Jacobsen. Publish/subscribe network designs for multiplayer games. In Middleware, pp. 241{252. ACM, 2014.
A. Carzaniga, D. S. Rosenblum, and A. L. Wolf. Design and evaluation of a wide-area event noti cation service. ACM Transactions on Computing Systems, 19(3):332{383, 2001.
M. Castro, P. Druschel, A.-M. Kermarrec, and A. Rowstron. Scribe: a large-scale and decentralized application-level multicast infrastructure. IEEE Journal on Selected Areas in Communications, 20(8):1489{1499, 2002.
A. K. Y. Cheung and H.-A. Jacobsen. Load balancing content-based publish/subscribe systems. Trans. On Computing Systems, 28(4):9:1{9:55, Dec. 2010.
G. Chockler, I. Keidar, and R. Vitenberg. Group communication specications: a comprehensive study. ACM Computing Surveys, 33(4):427{469, 2001.
G. Chockler, R. Melamed, Y. Tock, and R. Vitenberg. Constructing scalable overlays for pub-sub with many topics. In PODC, pp. 109{118, 2007.
G. Chockler, R. Melamed, Y. Tock, and R. Vitenberg. Spidercast: A scalable interest-aware overlay for topic-based pub/sub communication. In DEBS, pp. 14{25, 2007.

P. T. Eugster, P. Felber, R. Guerraoui, and A. Kermarrec. The many faces of publish/subscribe. ACM Computing Surveys, 35(2):114{131, 2003.
J. Gascon-Samson, F.-P. Garcia, B. Kemme, and J. Kienzle. Dynamoth: A scalable pub/sub middleware for latency-constrained applications in the cloud. In ICDCS, 2015, to appear.
M. Han, K. Daudjee, K. Ammar, M. T. Ozsu, X. Wang, and T. Jin. An experimental comparison of pregel-like graph processing systems. PVLDB, 7(12):1047{1058, 2014.
H. Jacobsen, A. K. Y. Cheung, G. Li, B. Maniymaran, V. Muthusamy, and R. S. Kazemzadeh. The PADRES publish/ subscribe system. In Principles and Applications of Distributed Event-Based Systems, pp. 164{205. IGI Global, 2010.
Z. Khayyat, K. Awara, A. Alonazi, H. Jamjoom, D. Williams, and P. Kalnis. Mizan: a system for dynamic load balancing in large-scale graph processing. In Eurosys, pp. 169{182, 2013.
J. Kienzle, C. Verbrugge, B. Kemme, A. Denault, and M. Hawker. Mammoth: A Massively Multiplayer Game Research Framework. In Foundations of Digital Games, pp. 308 { 315. ACM Press, Apr. 2009.
M. Li, F. Ye, M. Kim, H. Chen, and H. Lei. A scalable and elastic publish/subscribe service. In IPDPS, pp. 1254 {1265, 2011.
H. Liu, M. Petrovic, H.-A. Jacobsen, and Z. Wu. Optimized Cluster-based Filtering Algorithm for Graph Metadata. Information Sciences, 181(24):5468{5484, Dec. 2011.
Y. Low, J. Gonzalez, A. Kyrola, D. Bickson, C. Guestrin, and J. M. Hellerstein. Distributed graphlab: A framework for machine learning in the cloud. PVLDB, 5(8):716{727, 2012.
G. Malewicz, M. H. Austern, A. J. C. Bik, J. C. Dehnert, I. Horn, N. Leiser, and G. Czajkowski. Pregel: a system for large-scale graph processing. In International Conference on Management of Data, pp. 135{146, 2010.
D. Nicoara, S. Kamali, K. Daudjee, and L. Chen. Hermes: Dynamic partitioning for distributed social network graph databases. In EDBT, pp. 25{36, 2015.
M. Petrovic, H. Liu, and H. Jacobsen. G-topss: fast ltering of graph-based metadata. In WWW, pp. 539{547, 2005.
P. R. Pietzuch and J. Bacon. Hermes: A distributed event-based middleware architecture. In ICDCS Workshops '02), pp. 611{618, 2002.
S. Salihoglu and J. Widom. GPS: a graph processing system. In Conference on Scienti c and Statistical Database Management, SSDBM, 2013.
V. Setty, M. Van Steen, R. Vitenberg, and S. Voulgaris. Poldercast: Fast, robust, and scalable architecture for p2p topic-based pub/sub. In Middleware, pp. 271{291, 2012.
S. Uppoor, O. Trullols-Cruces, M. Fiore, and J. M. Barcelo-Ordinas. Generation and analysis of a large-scale urban vehicular mobility dataset. Trans. On Mobile Computing, 13(5):1061{1075, 2014.
Y. Zhao, K. Kim, and N. Venkatasubramanian. Dynatops: A dynamic topic-based publish/subscribe architecture. In DEBS, pp. 75{86, 2013.

* cited by examiner

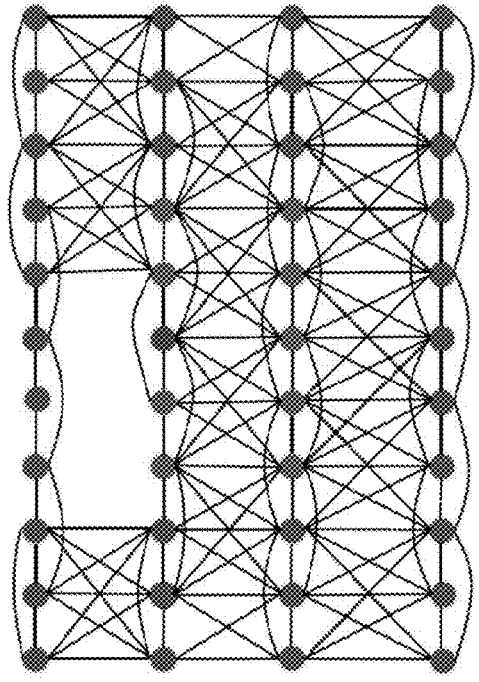
Figure 2A
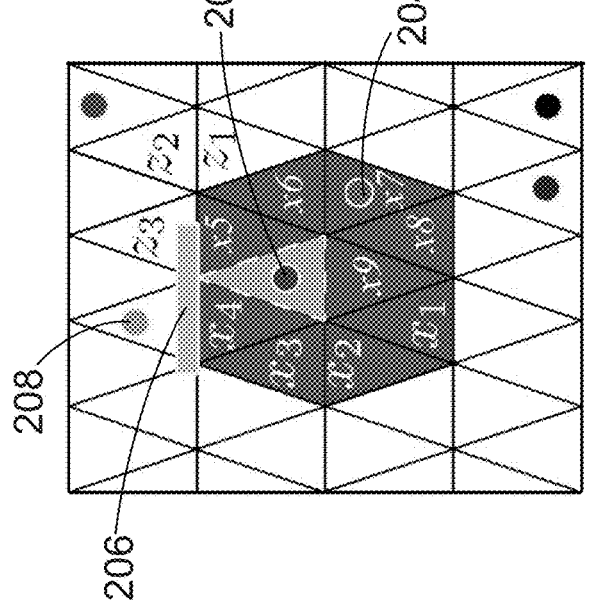
Figure 2B
Figure 3A
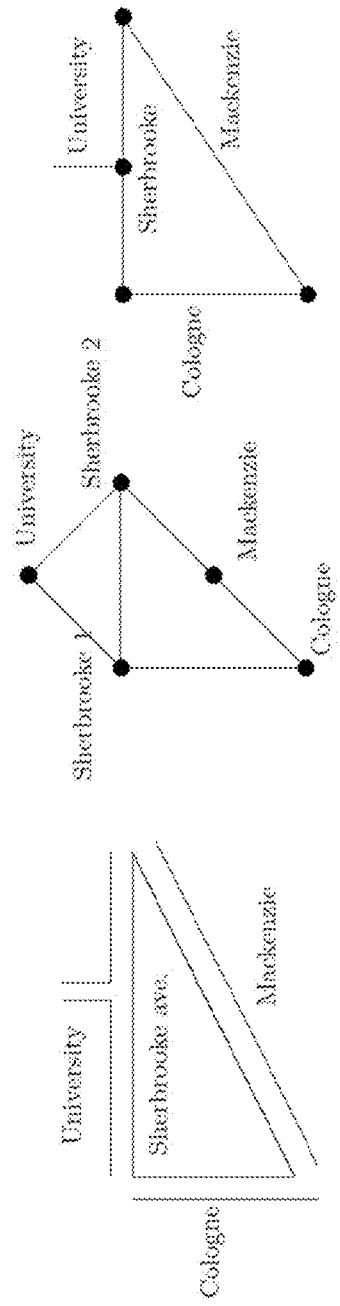
Figure 3B
Figure 3C

METHODS AND SYSTEMS FOR GRAPH-BASED PUBLICATION-SUBSCRIPTION

CROSS-REFERENCE TO RELATED APPLICATIONS

The present application claims priority under 35 U.S.C. 119(e) of Provisional Patent Application bearing Ser. No. 62/262,416 filed on Dec. 3, 2015, the contents of which are hereby incorporated by reference.

FIELD OF THE INVENTION

This invention relates to publish/subscribe communication tools and more particularly to graph-based publish/subscribe model for expressing consumer interest in the semantic information domain.

BACKGROUND OF THE INVENTION

Within software architectures, PUBlish-SUBscribe (PUBSUB) is a messaging pattern where senders of messages, called publishers, do not program messages to be sent directly to specific receivers, called subscribers. Instead, messages are relayed via a PUBSUB middleware without publishers and subscribers knowing each other. Subscribers express interest in receiving certain publications via a subscription primitive that allows the expression of restrictions in the kind of publications the subscriber wants to receive. When a publisher now sends a publication to the PUBSUB middleware, the middleware will forward the message to the subscribers whose subscriptions are matched by the publication. As such the PUBSUB has similarities with the message queue paradigm and might be part of a larger message-oriented middleware system. PUBSUB provides an elegant paradigm for disseminating information efficiently and anonymously between publishers and subscribers. Today, most messaging systems support both the PUBSUB and message queue models in their application programming interfaces (API), e.g. the Java Message Service (JMS).

The most common and simplest subscription language within the prior art is based on topics. Subscribers declare their interest in certain topics (also referred to as channels), and publishers tag their publications with one of the existing topics. The matching process at the middleware simply has to find all subscriptions that match the topic of the publication. Content-based PUBSUB systems deploy a more powerful subscription language that allows the specification of filters over the actual content. For instance, a publication contains attribute/value pairs and subscriptions contain predicates over the attribute set. In this sense, content-based systems assume the content to have some structure (e.g., triples similar to a relational model, semi-structured documents such as Extensible Markup Language (XML) or even graphs such as Resource Description Framework (RDF)), and the subscriptions are written in some query language (e.g., predicates similar as in Structured Query Language (SQL), or path queries over XML documents). There exist many academic and commercial PUBSUB systems, both with topic- and content-based subscription languages, and they are deployed in many different application domains for notification purposes.

As will become discussed below, new data and information exchange model has been established using an advanced PUBSUB communication model that is intuitive and useful for a large number of application domains. This is referred to as a graph-based PUBSUB model (GR_PUBSUB). Over the last decade graph models have gained attention in a number of different areas of computer science as it lends itself well to an intuitive description of a wide range of application domains. Accordingly, graph-based data management has been the subject of significant attention in the past few years.

Accordingly, embodiments of the invention address limitations within the prior art. For example, it would be beneficial to (i) allow for publications and subscriptions to refer to a common, potentially dynamic graph that represents part of the semantics of the application domain, further referred to as application graph, (ii) to enable the PUBSUB to exploit a powerful graph query language that allows subscribers to express interest and publishers to express the coverage of the publication with reference to this application graph, in a way that is intuitive for the application on hand. With this in mind, it would be beneficial to have an efficient PUBSUB middleware that can efficiently and effectively manage the application graphs, the subscriptions, expressed via graph-based subscription language, and match them against graph-based publications.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to publish/subscribe communication tools and more particularly to graph based models for expressing consumer interest in the semantic information domain.

In accordance with a first aspect, there is provided a method for graph-based publication/subscription. The method comprises creating a graph comprising a plurality of nodes and a plurality of edges, each node representative of a point of interest in an information domain, each edge linking a first one of the plurality of nodes and a second one of the plurality of nodes and representative of a relationship between a first point of interest and a second point of interest in the information domain; receiving, from at least one publisher, a first request to publish content on at least one of at least one selected node and at least one selected edge of the graph; receiving, from at least one subscriber, a second request to subscribe to at least one of a subset of the plurality of nodes and a subset of the plurality of edges; correlating the first request with the second request to determine whether the subset of the plurality of nodes comprises the at least one selected node and whether the subset of the plurality of edges comprises the at least one selected edge; and notifying the content to the at least one subscriber if the subset of the plurality of nodes comprises the at least one selected node and the subset of the plurality of edges comprises the at least one selected edge.

In some embodiments, the method further comprises one of assigning at least one node attribute to each node and assigning at least one edge attribute to each edge. A value of the at least one node attribute and a value of the at least one edge attribute change over time.

In some embodiments, the at least one edge attribute comprises at least one of an edge type and an edge weight, the edge type indicative of a relationship between the first one of the plurality of nodes and the second one of the plurality of nodes linked by each edge, and the edge weight indicative of a degree of relatedness between the first one of the plurality of nodes and the second one of the plurality of nodes.

In some embodiments, the at least one node attribute is a unique identifier associated with each node.

In some embodiments, receiving the second request comprises receiving an identification of the subset of the plurality of nodes as of interest to the at least one subscriber.

In some embodiments, receiving one of the first request and the second request comprises receiving a graph query comprising at least one parametrized function operative on the graph, evaluating the at least one parametrized function, and determining the at least one of the at least one selected node and the at least one selected edge or the at least one of the subset of the plurality of nodes and the subset of the plurality of edges accordingly.

In some embodiments, the graph query is received as comprising the at least parametrized function comprising one of a distance function, a hop distance function, a shortest path function, and a selection of values for the at least one node attribute and the at least one edge attribute.

In some embodiments, the method further comprises, in response to a change in the information domain, dynamically modifying the graph comprising at least one of adding one or more nodes, removing one or more nodes, adding one or more edges, removing one or more edges, modifying the at least one node attribute of one or more nodes, and modifying the at least one edge attribute of one or more edges, and reevaluating one or more subscriptions to the graph accordingly.

In some embodiments, the method further comprises receiving, from the at least one subscriber, a third request to subscribe to at least one of a new subset of the plurality of nodes and a new subset of the plurality of edges; and modifying at least one of the subset of the plurality of nodes and the subset of the plurality of edges to match the at least one of the new subset of the plurality of nodes and the new subset of the plurality of edges, thereby replacing an existing subscription associated with the second request with a new subscription associated with the third request.

In some embodiments, the first request is indicative of a request to publish content on a subgraph formed as a union of selected ones of the plurality of nodes and selected ones of the plurality of edges. The second request is correlated with the first request to determine whether the subset of the plurality of nodes and the subset of the plurality of edges overlap the subgraph. The content is notified to the at least one subscriber if the subset of the plurality of nodes and the subset of the plurality of edges overlap the subgraph.

In accordance with a second aspect, there is provided a system for graph-based publication/subscription. The system comprises a processing unit, and a non-transitory memory communicatively coupled to the processing unit and comprising computer-readable program instructions executable by the processing unit for creating a graph comprising a plurality of nodes and a plurality of edges, each node representative of a point of interest in an information domain, each edge linking a first one of the plurality of nodes and a second one of the plurality of nodes and representative of a relationship between a first point of interest and a second point of interest in the information domain, receiving, from at least one publisher, a first request to publish content on at least one of at least one selected node and at least one selected edge of the graph, receiving, from at least one subscriber, a second request to subscribe to at least one of a subset of the plurality of nodes and a subset of the plurality of edges, correlating the first request with the second request to determine whether the subset of the plurality of nodes comprises the at least one selected node and whether the subset of the plurality of edges comprises the at least one selected edge, and notifying the content to the at least one subscriber if the subset of the plurality of nodes comprises the at least one selected node and the subset of the plurality of edges comprises the at least one selected edge.

In some embodiments, the instructions are executable by the processing unit for one of assigning at least one node attribute to each node and assigning at least one edge attribute to each edge. A value of the at least one node attribute and a value of the at least one edge attribute change over time.

In some embodiments, the instructions are executable by the processing unit for assigning the at least one edge attribute comprising at least one of an edge type and an edge weight, the edge type indicative of a relationship between the first one of the plurality of nodes and the second one of the plurality of nodes linked by each edge, and the edge weight indicative of a degree of relatedness between the first one of the plurality of nodes and the second one of the plurality of nodes.

In some embodiments, the instructions are executable by the processing unit for receiving the second request comprising receiving an identification of the subset of the plurality of nodes as of interest to the at least one subscriber.

In some embodiments, the instructions are executable by the processing unit for receiving one of the first request and the second request comprising receiving a graph query comprising at least one parametrized function operative on the graph, evaluating the at least one parametrized function, and determining the at least one of the at least one selected node and the at least one selected edge or the at least one of the subset of the plurality of nodes and the subset of the plurality of edges accordingly.

In some embodiments, the instructions are executable by the processing unit for receiving the at least parametrized function comprising one of a distance function, a hop distance function, a shortest path function, and a selection of values for the at least one attribute and the at least one edge attribute.

In some embodiments, the instructions are executable by the processing unit for, in response to a change in the information domain, dynamically modifying the graph comprising at least one of adding one or more nodes, removing one or more nodes, adding one or more edges, removing one or more edges, modifying the at least one node attribute of one or more nodes, and modifying the at least one edge attribute of one or more edges; and reevaluating one or more subscriptions to the graph accordingly.

In some embodiments, the instructions are executable by the processing unit for receiving, from the at least one subscriber, a third request to subscribe to at least one of a new subset of the plurality of nodes and a new subset of the plurality of edges; and modifying at least one of the subset of the plurality of nodes and the subset of the plurality of edges to match the at least one of the new subset of the plurality of nodes and the new subset of the plurality of edges, thereby replacing an existing subscription associated with the second request with a new subscription associated with the third request.

In some embodiments, the instructions are executable by the processing unit for receiving the first request indicative of a request to publish content on a subgraph formed as a union of selected ones of the plurality of nodes and selected ones of the plurality of edges, correlating the second request with the first request to determine whether the subset of the plurality of nodes and the subset of the plurality of edges overlap the subgraph, and notifying the content to the at least one subscriber if the subset of the plurality of nodes and the subset of the plurality of edges overlap the subgraph.

In accordance with a third aspect, there is provided a non-transitory computer readable medium having stored thereon program instructions executable by a processor for creating a graph comprising a plurality of nodes and a plurality of edges, each node representative of a point of interest in an information domain, each edge linking a first one of the plurality of nodes and a second one of the plurality of nodes and representative of a relationship between a first point of interest and a second point of interest in the information domain; receiving, from at least one publisher, a first request to publish content on at least one of at least one selected node and at least one selected edge of the graph; receiving, from at least one subscriber, a second request to subscribe to at least one of a subset of the plurality of nodes and a subset of the plurality of edges; correlating the first request with the second request to determine whether the subset of the plurality of nodes comprises the at least one selected node and whether the subset of the plurality of edges comprises the at least one selected edge; and notifying the content to the at least one subscriber if the subset of the plurality of nodes comprises the at least one selected node and the subset of the plurality of edges comprises the at least one selected edge.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2A and FIG. 2B depict an example of a tile based map and its representation as an application graph within a multiplayer gaming environment representing an application domain with which graph based PUBSUB (GR-PUBSUB) communication tools according to embodiments of the invention can be applied;

FIG. 3A, FIG. 3B, and FIG. 3C depict part of a street map of an imaginary city together with its segment-node representation and corresponding segment-edge representation as part of an application domain to which a GR-PUBSUB according to embodiments of the invention can be applied;

DETAILED DESCRIPTION

Figure 1:
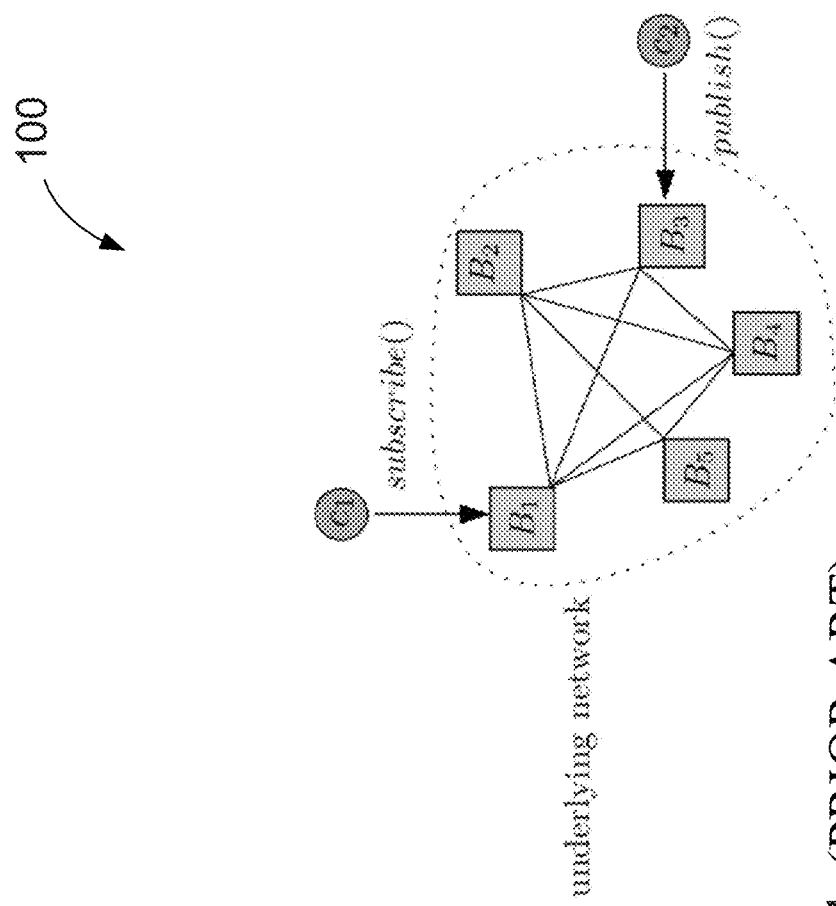
FIG. 1 depicts a distributed publication/subscription server system (PUBSUB) to which embodiments of the invention can be applied.

The present invention is directed to publish/subscribe communication tools and more particularly to graph based models for expressing consumer interest in the semantic information domain.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It should be understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and the terms are not to be construed as specifying components, features, steps or integers. Likewise the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

The typical interface of a PUBSUB middleware application allows consumers to subscribe to content of interest and correspondingly to unsubscribe whenever they are no longer interested in this content. Producers of content can publish a message. Furthermore, some systems require publishers to advertise the type of content they want to publish before they can submit their first publication, and later unadvertise if they will not send any further content of this type. Advertisements are common in distributed PUBSUB systems, and embodiments of the invention also support them but they are not discussed in detail within this specification.

The two most-commonly employed PUBSUB language styles are topic-based and content-based PUBSUBs.

Topic-based PUBSUBs allow subscribers to subscribe to particular topics (e.g., subscribe(sportsnews)). Publishers tag their notifications with a specific topic (e.g., publish (sportsnews, publication body). The PUBSUB engine forwards a publication to all subscribers that have subscribed to the specific topic. Despite its simple data model, topic-based PUBSUB is used widely in practice, e.g., Google uses it for sending push notifications to Android devices; chat and instant messaging services and applications rely on it, and even Twitter's hashtags can be considered topics. Advanced topic-based systems group topics in hierarchies, and subscriptions can subscribe to different levels of the hierarchy or even use wildcards. One of the reasons for its popularity is the efficiency in which publications can be matched to subscriptions. In other words, finding the subscribers to which any particular message has to be sent to is facilitated using efficient basic data structures such as hash tables.

Topic-based PUBSUB is related to group multicast. Subscribing to a topic resembles joining a group, and publishing on a topic resembles multicasting a message to all members of the group.

Content-based subscription languages allow subscribers to describe their interest by specifying filters on the content itself. For that reason, publication content is often assumed to be structured, such as a set of attribute/value pairs, or an XML document. In the case where publication content is assumed to be structured, the subscriptions can then be predicates similar to what can be found in the WHERE clause of SQL statements including Boolean operators. In the case where publication content is assumed to be an XML document, a subscription could be an expression written in the XPath query language. A common example from the stock market domain has attributes stock and price, a publication indicates values for those two attributes, e.g., publish(stock=IBM,price=100), and a subscription indicates interest in a certain range of the possible attribute domains, e.g., subscribe((stock=IBM V stock=Oracle) Λ price<100).

Turning now to the middleware architecture, PUBSUB can be implemented as client/server architecture, possibly with multiple servers, also called brokers, or in a peer-to-peer fashion without a central authority.

In a centralized architecture, a single PUBSUB engine accepts all subscribe/unsubscribe/publish messages. It maintains subscriptions in its database, activates the matching process whenever a publication arrives and forwards the publication to the interested subscribers. Many open-source architectures such as Redis or Java Messaging Service follow this approach.

In order to provide better scalability, distributed broker architectures are common. The idea of most architectures is that the brokers build a broker overlay, and clients (i.e., publishers and subscribers) connect to and interact with only one of the brokers. An example architecture 100 is provided in FIG. 1, where brokers $B_1$, $B_2$, $B_3$, and $B_4$ form a connected network. Each broker $B_1$, $B_2$, $B_3$, or $B_4$ serves as a connecting point to the network for clients as in $c_1$ and $c_2$. Clients (e.g. clients $c_1$ and $c_2$) issue messages to the network via their corresponding brokers (e.g. brokers $B_1$ and $B_3$ in FIG. 1). Routing of messages can be done in many different ways. For instance, subscriptions could be broadcast throughout the entire broker network so that each broker knows about all subscriptions. With this, whenever a publication is submitted to a broker, this broker only has to forward it to those other brokers that have at least one subscription matched by the publication. Different solutions attempt to minimize the number of messages that have to be sent through the broker network as well as the subscription information that has to be kept at every broker. One common mechanism to do so in content-based systems is through advertisements. Before being able to publish, a publisher first has to advertise the type of content that it wants to disseminate. The advertisements contain predicates on attributes similar to subscriptions and future publications need to follow the advertised constraints (e.g., if a publisher advertises to publish on IBM stocks, then future publications may only be on the IBM stock). Then, subscriptions only need to be sent to brokers who have publishing clients that can generate content, described through advertisements, that is of interest for the subscribers.

In recent years, an increasing number of cloud-based approaches have been proposed, mainly for content-based PUBSUB. The BlueDove system, for example, proposes a brokerless, two-layer scalable attribute-based PUBSUB system which supports multi-dimensional attributes. The attribute space for each dimension is split over a set of Cloud matching servers. Subscriptions and publications are forwarded to matching servers using dispatching servers. In contrast the E-StreamHub middleware aims at providing an elastic content-based PUBSUB platform that adds/removes nodes based on the current system load.

In contrast, Cheung et al. in "Load Balancing Content-based Publish/Subscribe Systems" (Trans. Computing Systems, Vol. 28(4), pp. 9:1-9:55) proposes a load-balancing approach for broker-based content-based PUBSUB systems built over the system of PADRES published by Jacobsen et al. in "The PADRES Publish/Subscribe System" (Principles and Applications of Distributed Event Based Systems, pp. 164-205, IGI Global 2010). In contrast, DYNAMOTH, as described by Gascon-Samson et al. in "Dynamoth: Scalable Pub/Sub Middleware for Latency-Constrained Applications in the Cloud" ($35^{th}$ IEEE Int. Conf. Distributed Computing Systems, pp. 486-496), provides a cloud-based infrastructure for topic-based PUBSUB where topics are distributed across many servers, and servers can be added and removed dynamically as the workload changes without service interruption.

An alternative to centralized implementation of PUBSUB is peer-to-peer (P2P) implementation. In peer-to-peer architectures, the clients themselves implement the server and build a peer-to-peer overlay. Most of these systems use topic-based languages. For example, SCRIBE as presented by Castro et al. in "SCRIBE: A Large-Scale and Decentralized Application Level Multicast Infrastructure" (IEEE J. Sel. Area in Comms., Vol. 20(8), pp. 1489-1499) uses dissemination trees to forward publications on a topic to all subscribers. The peers whose identifier is the closest to the hashed topic value is the root. Publications and subscriptions are sent to this root peer. The path a subscription takes from a peer to the root is the reverse to the path any publication will then take from the root to this subscriber.

POLDERCAST in contrast, as presented by Setty et al. in "POLDERCAST: Fast, Robust. and Scalable Architecture for P2P Topic-based Pub/Sub" (Middleware 2012, pp. 271-291), is a dynamic P2P topic-based PUBSUB system where all subscribers for a given channel are interconnected using a ring overlay (and additional random links). Thus, any publication reaching a subscriber can then reach other subscribers in a linear fashion (worst case) or faster using the additional links. SPIDERCAST as presented by Chockler et al. in "SPIDERCAST: A scalable Interest-Aware Overlay tor Topic-based Pub/Sub Communication" (Distributed Event Based Systems 2007, pp. 14-25) is a further P2P topic-based PUBSUB systems that use distributed protocols to optimize the routing overlay. DYNATOPS as presented by Zhao et al. in "DYNATOPS: A Dynamic Topic-based Publish/Subscribe Architecture" (Distributed Event Based Systems 2013. pp. 75-86) features a dynamic self-reconfigured channel-based PUBSUB system with brokers that can handle scenarios where subscriptions are short-lived.

Turning now to graph management, it is noted that, over the past two decades, there has been significant growth in applications for which a graph data model is a natural fit, such as social graphs, communication and road networks, or biological interaction pathways. As a result, the idea of treating graphs as a first-class data structure for data management has received considerable attention. Angles et al. in "Survey of Graph Database Models" (ACM Computing Surveys, Vol. 40(1), pp. 1-49) summarizes graph models of early graph-based data management systems. More recently, several graph-based database systems have been proposed that directly store graphs and offer a graph-based query language, such as Neo4j2 (http://neo4j2.com), HERMES as presented by Nicoara et al. in "HERMES: Dynamic Partitioning for Distributed Social Network Graph Databases" ($18^{th}$ Int. Conf. Extending Database Technology, 2015), an extension of Neo4j, or OrientDB (http://orientdb.com). Finally, graph processing frameworks can provide a means to design and develop parallel processing algorithms for large graphs where execution is split across many worker nodes. Examples of these include:

Google's PREGEL as presented by Malewicz et al. in "PREGEL: A System for Large-Scale Graph Processing" (Int. Conf. Management of Data, pp. 135~146. 2010);

Apache Giraph (http://giraph.apache.org);

GPS as presented by Salihoglu et al. in "GPS: A Graph Processing" (Conf. Scientific and Statistical Database Management, SSDBM, 2013);

GraphLab as presented by Low et al. in "Distributed GRAPHLAB: A Framework for Machine Learning in the Cloud" (Proc. VLDB Endowment, Vol. 5(8), pp. 716-727); and MIZAN as presented by Khayyat et al. in "MIZAN: A System for Dynamic Load Balancing in Large Scale Graph Processing" (Proc. $8^{th}$ ACM European Conference on Computer Systems, 2013, pp. 1698-182).

These systems focus on in-memory batch processing of graph analytics queries. Petrovic et al. in "G-topss: Fast Filtering of Graph Based Networks" (Proc. $14^{th}$ Int. Conf. on World Wide Web, pp. 539-547, 2005) developed algorithms for PUBSUB-style matching of graph-based data, such as Rich Site Summaries (RSSs) and Resource Description Framework Schema (RDFS). Subscriptions and publications are considered graphs and matching between graphs is the identification of graph isomorphisms between input (sub) graphs. The prior art of Petrovic was aimed at solving the centralized PUBSUB matching problem, and was later extended by Liu et al. in "Optimised Cluster-based Filtering Algorithm for Graph Metadata" (Inf. Sci., Vol. 181(24), pp. 5468-5484) to scale across a cluster of machines.

In contrast to the prior art, Graph-based PUBSUB (GRAPS) has been established as a methodology that looks at distributed PUBSUB, considers an application graph to which clients publish and subscribe, and offers a subscription language that facilitates pub/sub communication over graphs. In particular, GRAPS considers an proposed application graph that is stored by the PUBSUB middleware and can be changed by the application through appropriate interfaces, publications that are tagged with meta-information that relates them to node(s), edge(s) or a subgraph of the application graph (e.g., by expressing a graph-based query on the application graph), subscriptions that contain a graph-based query that evaluates, at a given time and state of the application graph, to a subgraph of this application graph, and a matching process that matches incoming publications according to their meta-information with subscriptions on the graph.

Accordingly, a user of a PUBSUB tool according to an embodiment of the invention provides a graph network reflecting a predetermined portion of the semantics of an application domain. This graph network (graph) comprises a plurality of nodes and a plurality of edges whereby each edge connects one node of the plurality of nodes with a second node of the plurality of nodes. As discussed below a plurality of first attributes can be assigned to the set of edges wherein each of these attributes further characterizes the relationship between the nodes it connects. Further, a plurality of second attributes can be assigned to the plurality of nodes to further characterize the nodes. Both edges and nodes can have an attribute, referred to as identifier attribute such that the attribute values of these identifier attributes are unique across all edges and respectively all nodes. In the following, this graph network is referred to as an application graph, and the union of any subset of nodes of the plurality of nodes and subset of edges connecting nodes in that subset of nodes as a subgraph of the application graph.

Accordingly, within embodiments of the invention a PUBSUB system exploits a middleware application hosted upon a plurality of servers connected to a network accessible by publishers and subscribers, wherein the middleware application comprises computer readable instructions stored within non-volatile, non-transitory storage media of the plurality of servers. The execution of these instructions provides the following three features:

(1) Storage of the application graph within the PUBSUB middleware as well as methods to maintain the graph later on, for example, by adding/removing nodes and edges or changing attribute values of nodes and edges.

(2) Acceptance and storage of subscriptions, expressed via a graph-based subscription language. At any given time and state of the application graph, a subscription query expresses interest in a node, edge or subgraph of the current version of the application graph.

(3) Acceptance of a publication, consisting of content and tagged by a node identifier, edge identifier or a query over the graph, followed by determining the node, edge or subgraph of the application graph the publications refer to, followed by forwarding the content of the publication to subscriptions where the node, edge or subgraph the subscription is interested in overlaps with the node, edge or subgraph the publication refers to (i.e. there is at least one common node or edge).

A graph model and a subscription language for graphs that are believed to be useful to facilitate PUBSUB communication over graphs will now be described. The proposed model is more in line with topic-based approaches than with content-based approaches. The graph provides a structure over the content in that it partitions the content in a similar way as topic-based approaches partition content into different topics. The graph model is able to express directed and undirected non-hierarchical relationships. Overall, the goal of the proposed subscription language is to be intuitive, simple and powerful.

A publication graph $GG=\langle N,E \rangle$ is a standard graph consisting of a set of nodes N and a set of edges E each connecting two vertices in N. In order to be general and support a wide range of applications, nodes and edges are allowed to have attributes whose values can change over time. One possible attribute could be an edge type allowing for several different types of relationships between nodes. That is, it allows two nodes in N to be connected through more than one edge. By default, a weight attribute on edges that represents the degree of relatedness between the nodes it connects is supported. It is assumed that all nodes have an identifying attribute whose value is unique within the graph. The publication graph is provided by the application, stored in the GRAPS middleware, and can be dynamically changed via an API that allows for addition and removal of nodes, additional and removal of edges, and changes in the node and edge attributes.

It is accordingly desirable for the GRAPS middleware to be able to handle several graphs at the same time. Thus, each graph has a unique identifier. Publications and subscriptions will typically be over one of the graphs maintained in GRAPS.

For sake of simplicity, in the following, the proposed system is described for a restricted set of publications, namely publications that are tagged only with a single node in a given graph. Thus, their syntax is $\langle$publication$\rangle$::='publish('$\langle$grpahId$\rangle$','$\langle$nodeId$\rangle$','
    $\langle$payload$\rangle$')' where graphId is the identifier of a graph, nodeId is the identifier of a node in the graph, and payload is any application dependent content. It is subsequently discussed herein the extent to which other forms of publications could be useful for certain applications. In particular, a publication could also be on a single edge, or it could contain a graph-based query, similar as described below for subscriptions, that evaluates (e.g. upon evaluation of the corresponding parametrized function, as discussed herein) to a full subgraph. In other words, both publications and subscriptions can contain queries that return a subset of the graph, as will be discussed further below.

A further aspect of the proposed language lies in the sophisticated way subscriptions can be formulated. The idea is that a subscription determines a subgraph of the application graph. Given the simplified publications assumed above, it is enough to determine the set of nodes contained in this subgraph, such that all publications on these nodes match the subscription. Two different ways to determine such a set are defined, namely through simple or graph subscriptions. A subscription request returns an identifier (subId) which the subscriber can later use to unsubscribe (or re-subscribe). Thus, we have $\langle$subscription$\rangle$::=$\langle$subId$\rangle$':='$\langle$simplesubscnption$\rangle$|
    $\langle$graphsubscription$\rangle$ Simple subscriptions allow a client to explicitly specify a set of nodes the client wants to subscribe to. Any future publication made on one of the nodes will match that subscription and hence be forwarded to the client. The syntax of simple subscriptions is as follows indicating the node identifiers (nodeID) of all nodes of interest:

$\langle$subscription$\rangle$::='subscribe('$\langle$graphId$\rangle$','
    $\langle$nodeID$\rangle$[','$\langle$nodeID$\rangle$]*')'

A graph subscription is significantly different, as it allows the client to express interest based on a graph query. The query can involve nodes and their attributes, as well as exploit the relationships between nodes expressed with the weighted edges and their attributes. Concretely, the graph subscription consists of a set of predicates, where each predicate is a parameterized function that operates on the graph. The proposed middleware supports a set of predefined functions, e.g., distance (in terms of sum of edge weights), hop distance, selecting specific (or ranges of) attribute values, and shortest path. In principle, though, any application-specific function operating on the graph can be used, as long as it returns a set of nodes as a result.

$\langle$graphsubscription$\rangle$::='graphsubscribe('$\langle$graphId$\rangle$,[
    $\langle$graphfunction$\rangle$]*')'

$\langle$graphfunction$\rangle$::=$\langle$functionId$\rangle$
    '('[$\langle$parameterlist$\rangle$]')'

When receiving a subscription, the middleware evaluates each graph function in isolation, calculates the intersection of all result sets, and then subscribes the client to the resulting nodes. The original subscription is also kept, in case the graph or subscription evolves in the future as outlined below.

Graph subscriptions are powerful, mostly because instead of directly enumerating the nodes of interest, a client can express the semantics of his/her interest by exploiting the meaning of the relationships between the nodes encoded in the edges. Furthermore, the client needs only limited knowledge of the graph. Typically, knowledge of some nodes and their relationships that are relevant suffices. For example, imagining that the graph represents a geographic area, the nodes represent key locations in that area, and the edge weights encode the distance between those locations, the subscription:

mySub:=graphsubscribe(graphId,max WeightDist
(nodeX,dLimit))

subscribes to all publications on nodes that are at most a distance dLimit units away from nodeX. This subscription clearly expresses the interest of a client who is currently in the geographic area at a position close to nodeX and is interested in receiving relevant information from locations that are nearby. Furthermore, to state interest, the client only needs limited information of the graph. In fact, only the nodeID of the node closest to the client's location is needed. Other more detailed examples of advanced graph subscriptions are presented below.

At present implemented embodiments of the middleware according to embodiments of the invention support two forms of dynamic behaviour.

In one embodiment, if the application domain evolves, the publication graph within GRAPS might evolve accordingly. To support such a dynamic graph, the proposed approach allows the addition and removal of nodes and edges. Since graph subscriptions encode the interest of the client expressed using properties of the graph, all graph subscriptions that are potentially affected by the graph change need to be re-evaluated when the underlying graph changes.

In another embodiment, subscriptions not only change indirectly when the underlying graph changes, but also evolve when the interest of clients change. Such dynamic subscriptions are supported through the concept of re-subscriptions. The idea is that a subscription already in the system is replaced by a new subscription. Syntactically, this is done simply by replacing the graphId parameter in the subscription with a subscription identifier. After determining the set of nodes covered by the re-subscription, GRAPS adjusts the set of nodes covered by the original subscription accordingly. In principle, instead of re-subscribing, a client could unsubscribe its old subscription and submit a new one. The concept of a resubscription, however, has several advantages. First, only one operation needs to be submitted instead of two. Second, atomicity of the operation is easier to achieve. In case studies, it is often observed that the set of nodes in the resubscription significantly overlaps with the node set of the original subscription (i.e. the two sets contain at least one common node). Thus, a resubscription operator guarantees the continuity of not missing any publications on nodes in this intersection.

For example, the client that issued the subscription presented herein above (when discussing subscription formulation) is located at home at nodeX. The client then decides to go for a walk in a park close by at location nodeY, which is a neighboring node of nodeX in the graph. The client is therefore now interested in receiving information from locations that are close to nodeY. Furthermore, while walking, being less mobile and using the expensive data plan for notifications, the client may want to shrink the interest radius. This can be achieved with the following resubscription:

mySub:=graphsubscribe(mySub,max WeightDist
(nodeY,3))

The home location nodeX will likely remain in the interest set after the resubscription. Thus, by having a single operation changing the interest set, it can be easily guaranteed that the client receives all publications on nodeX.

Three example application domains that are believed to benefit from a graph-based PUBSUB system, as it provides an intuitive data structure for the application at hand, will now be discussed. By looking at these case studies, the various opportunities and challenges of graph-based PUBSUB are also explored.

A first example application domain is multiplayer gaming. In many multiplayer games, each player has an avatar and moves around in a virtual world, being able to observe the actions of other players that are in its vision range, typically the close neighborhood of its current position. Whenever an avatar moves, other players that have this avatar in their vision range have to be informed about the move.

To determine a vision range, the game world is often split into tiles, and a player has a vision range that covers the tile it currently resides in and neighboring tiles up to a certain distance. FIG. 2A shows an example of a tile-based map where players appear as circles and tiles are triangles. The tiles x1, x2, x3, x4, x5, x6, x7, x8, and x9 correspond to tiles, which are visible to a player 202 from its current position. In particular, the player 202 can see all other players (e.g. player 204) that are in the tiles x1, x2, x3, x4, x5, x6, x7, x8, and x9 (i.e. tiles at most one (1) hop away from its current tile) and has to be informed about their updates. As there is an obstacle 206, the player cannot see players (e.g. player 208) in tiles behind the obstacle 206 although they are theoretically only one hop away. The visible tiles x1, x2, x3, x4, x5, x6, x7, x8, and x9 form an incomplete hexagon and the missing tiles are not visible due to the obstable 206 blocking them.

In "Publish/Subscribe Network Designs for Multiplayer Games" by Canas et al. (15$^{th}$ Int. Middleware Conf., pp. 241-252, 2014), several strategies were presented as to how topic- and content-based PUBSUBs can support update dissemination in such games. In one of the solutions, a topic is associated with each tile. A player subscribes to all tiles in its vision range, and a player publishes an update on the tile it currently resides in. When a player moves from one tile to the next, it unsubscribes from all tiles that are no more in its vision range, and subscribes to all tiles that are newly part of its vision range. For instance, if player 202 moves one tile to the right, it unsubscribes from tiles x1, x2, x3, and subscribes to tiles z1, z2, z3. Although an intuitively easy to understand approach, each move from one tile to the next leads to several unsubscriptions and several subscriptions. Thus, a second solution presented by Canas et al. uses content-based PUBSUB. There, the vision range is approximated by a square with the player in the center, and the player is subscribed to this square area through the subscription ranges of x and y coordinates (e.g., x>3∧x<7∧y>2∧y<6). A player publishes an update indicating the current x/y coordinates. Furthermore, whenever a player moves, it unsubscribes from the old square and subscribes to a new square centered around the new coordinates. The problem with this approach is that a square cannot handle obstacles as well as a tile-based approach.

It is believed that a graph-based approach is a better fit in this scenario. Tiles and their connectivity are well described by a graph as illustrated in FIG. 2B. Each tile is a node in the graph, and there are edges between neighboring tiles. In order to encode visibility in the edges, tiles that are separated by an obstacle are not connected. The mapping of publications (update dissemination) and subscriptions (vision range) onto this graph, denoted as G1, will also be readily understood. Referring to FIG. 2A in addition to FIG. 2B, whenever a player moves, it publishes the message on the node that represents the tile it resides in. For instance, when a player is in tile x4 and moves within the tile, it submits publish(G1, x4, payload) whereby the payload are the new x/y-coordinates. When the player moves to neighboring tile x3, it similarly submits publish(G1, x3, payload), again with the new x/y coordinates as payload. In order to receive updates about all players that are in its vision range, a player has to subscribe to all nodes that represent the tiles that are visible to the player, in our scenario tiles that are at most two hops away from the current tile. This can be represented in a straightforward way as a graph query as hop distance is a standard graph function. The subscription for tile x4 would be graphsubscribe(G1, hopDist(x4,1)). Every time a player moves from one tile to the next, it would re-subscribe using the same subscription, but with a different center node. For instance, assume the player's current subscription identifier is sub1 and the player moves from x4 to x3, then the player would submit graphsubscribe(sub1, hopDist(x3,1)). Compared to a topic-based approach, this leads to one semantic re-subscription instead of several subscriptions to several new tiles. Further, the developer does not need to compute the new tiles himself but can conveniently express the target tiles in form of an intuitive graph query.

Furthermore, by expressing the tiles and their relationships as a graph, the calculation of the vision range can be easily made more sophisticated. For instance, one could use edge distances that represent the distance between the center points of two neighboring tiles. Then, instead of a hop-based query, one could use a distance-based query to provide a more precise vision range in case not all tiles have the same size.

Accordingly, it can be noted that the graph will typically be static, as visibility typically does not change within the game world, unless the game supports terrain deformations or large, moving obstacles. There will be frequent publications (whenever a player performs an action of relevance to other players), and also frequent re-subscriptions (whenever a player moves to a new tile). The number of overall subscriptions will likely be proportional to the number of players in the game.

Another example application domain is traffic monitoring. Applications like Waze™/Google™ Maps have become very popular to monitor traffic. A street map can easily be modelled using a graph. Intuitively, each street is split into segments, from one intersection to the next. One option to model this as a graph is that the nodes are the segments, and two nodes are related by an edge if their corresponding segments meet at an intersection. This is referred to as the segment-node representation. The probably more intuitive, visualizable way is to have intersections as nodes, and each segment is the edge between two intersection nodes, referred to as segment-edge representation. Both possibilities are shown in FIG. 3A, FIG. 3B, and FIG. 3C. FIG. 3A shows the original street map, FIG. 3B illustrates the segment-node representation of the street map of FIG. 3A, and FIG. 3C illustrates the segment-edge representation of the street map of FIG. 3A. It should be understood that the segment-node and segment-edge representations can easily be transformed one into the other, and from a system-point of view any of the two could be used. As with games, the graph is generally static. Only if new streets appear or streets are obstructed (e.g., because of construction) would the graph need to be updated.

The following examples show how traffic monitoring applications can benefit from a PUBSUB infrastructure over such a graph. The following assumes a segment-node representation of the map.

A first example traffic monitoring application relates to central monitoring. Assuming a city is split into districts, where each district has a traffic control unit (e.g., police, municipality etc.), each control unit would be interested in the street segments that belong to its district. To encode the knowledge about districts in the graph, the nodes representing street segments would have an enumeration attribute district. The subscription that most adequately expresses the interest of traffic controllers would therefore look as follows:

mySub:=graphsubscribe(graphId,nodeAttr(district,=, District::downtown))

Cars would publish their current location on the segment in which they reside in regular intervals. If cars are assumed to not have that power, the road segments themselves could have sensors that send such publications whenever cars pass. In this scenario, subscriptions are sparse, but cover a large set of road segments. The subscriptions are also very static, i.e., they remain in the system for a long time, while one can expect to have a large amount of publications, especially when traffic is heavy.

A second example traffic monitoring application relates to traffic monitoring "on the go". Another possible GRAPS application is indeed to provide end users, i.e. the drivers, continuous updates on road conditions. In this case, the drivers become the subscribers, and the central control units mentioned above publish traffic conditions.

A possible example is that drivers have a traffic monitoring application installed in their car. When starting the route, drivers indicate their route (start to destination). The monitoring application then subscribes to the path of street segments contained in the route. It would be evident that the route may be defined by a mapping application, via a navigation application in execution, for example, as part of electronic systems of the user's vehicle, or through a routine within GRAPS that finds a path in a graph. It should be understood that such functionality and other corresponding functions can be integrated within the proposed solution or implemented through an interface. For example, the functionality could be implemented using a shortestPath function. The central control units, having collected traffic information using the above application, summarize the information, and publish, on a regular basis and on each of their segments, the current condition (e.g., "green" for no traffic, "orange" for some traffic and "red" for heavy traffic). At the driver side, the monitoring application visualizes these street conditions to the driver who can then take adequate actions.

It should be understood that more sophisticated monitoring applications could subscribe to more than just the trajectory path, or subscribe to alternative paths simultaneously. Also, similarly to the gaming application, as the driver advances and is no longer interested in the trajectory that has already passed, the monitoring application could re-subscribe on a regular basis, adjusting the start point of the path to the current location. Thus, as the driver approaches the destination, less traffic information needs to be transferred to the driver.

In this scenario, subscriptions, un-subscriptions, and re-subscriptions are frequent as cars start and end their journeys. Publications are in well-defined regular intervals on all nodes in the graph.

If one would like to use a segment-edge graph representation of the map, GRAPS would need to allow publications on edges. Also, graph queries would need to return edges instead of nodes, or possibly complete subgraphs containing nodes and edges. For now, it has been decided to simplify the GRAPS subscription language. Thus, it is desirable to represent the map in segment-node representation.

Social networks represent a different application domain that can take advantage of a Graph-based PUBSUB such as GRAPS. In this application domain, people are represented as nodes, and edges represent friend relationships among people. In Twitter™, for example, the follower relationship would be represented by a directed edge. In Facebook™, Facebook™ groups could be modelled as nodes with a special group attribute, and group membership could be represented with edges tagged with a similar group attribute. It would be evident that many social networks and their associated social media and social media services may be modelled through the graph-based model and exploit embodiments of the invention for their PUBSUB requirements.

In this scenario, the publication graph is quite dynamic. New nodes (i.e. new accounts) and new edges (i.e. new friend relationships and group memberships) are constantly created. Subscriptions are rather static as Facebook™ members are typically subscribed to all updates of their friends, i.e. "people" nodes that are one (1) "friend" edge away. However, subscriptions would evolve whenever a client updates their Facebook™ notification settings.

With graph subscriptions it is possible to express interest in more than just receiving updates from friends. For instance, using a social network graph where nodes are modeled with a profession attribute, a software developer could express interest in all publications from the immediate friends of a social network member m1 who also happen to be software developers. The subscription used to express this interest would therefore look as follows:

mySub:=graphSubscribe(graphId,hopDist($m1$,1),nodeAttr(profession,=,Profession::softwaredeveloper))

An embodiment of the system design, namely the manner in which graph-based publications and subscriptions are handled by an embodiment of the GRAPS middleware, will now be described. A centralized architecture with one GRAPS server handling all communications between publishers and subscribers is first described. It is then shown how the approach can be extended to a multi-server system, either centralized or distributed.

In the basic architecture of the centralized approach, all subscribers and publishers connect to a single GRAPS server. The server requires a graph database system in the form of a library. By using the library, GRAPS offers an application program interface (API) to store a graph, delete a graph, and manipulate an existing graph (e.g. delete and add edges and nodes, changing attribute values, etc.). Several graph libraries provide such features, the details of which are not discussed herein.

The manner in which GRAPS handles publications and subscription will now be described. For sake of simplicity, the description does not reference a graph identifier but assumes the operations take place on a specific graph G stored in the graph library. The operations are depicted in Algorithm 1 below. The data structures that are maintained are just an example as others may be employed without departing from the scope of the invention. When the GRAPS server receives a subscription requests, it assigns the subscription request a new subscription identifier subId and determines the set of nodes that are covered by the subscription. For a simple subscription this is immediately given. For a graph subscription, this requires to execute the functions indicated in the subscription on the graph G. The getNodes method in the algorithm depicts this task. Information about the subscription is then added to a subscription table ST. Each row of the table contains the subscription identifier as key, the list of node identifiers covered by the subscription, the original query string in case of a graph subscription, and the client identifier of the client that submitted the subscription.

Furthermore, in order to facilitate fast matching, a node subscription table is maintained. This is a hash NST table where each entry is a tuple (nodeId, [subId1, subId2, ... ]), where the node identifier is the key, and the value is the list of identifiers of subscriptions that contain this node. For each new subscription with identifier subId and node covered by the subscription, if there is already an entry for the node in NST, the subscription identifier is simply added to the list. Otherwise, a new entry in NST is created with the node's identifier as key and [sub/d] as value. The NST.add method in the algorithm 1 below depicts this task.

Unsubscribing removes the corresponding entry from ST and the subscription identifiers from the NST entries. As publications indicate exactly one node on which the publication is made, matching requires to look up the corresponding node entry in NST to determine all subscriptions that need to be notified. The client address of the subscription can be found in the corresponding entry in the subscription table ST.

---

Algorithm 1: Centralized GRAPS

---

Upon event receiving subscription s from a client c do
    subId ← new subId( )
    NI ← getNodes(s)
    ST.add(subId,NI,s,c)
    for all nodeId ∈ NI do
        NST.add(nodeId,subId)
    end for
end event
Upon event receiving un-subscription with subId from client c do
    NI ← ST.getNodes(subId)
    ST.remove(subId)
    for all nodeId ∈ NI do
        NST.remove(nodeId,subId)
    end for
end event
Upon event receiving publication p for node with nodeId do
    Subscribers ← NST.getSubscribers(nodeId)
    for all subId ∈ Subscribers do
        c ← T.getClient(subId)
        send p to c
    end for
end event

---

Not depicted in the algorithm 1 above are re-subscriptions. A re-subscription triggers a re-execution of the graph function in order to determine the new set. Then the original entry in ST is replaced, and NST is adjusted by removing the subscription identifier from all node entries that are now not covered by the resubscription, and by adding the subscription identifier to all entries that are newly covered by the resubscription. For nodes that were both in the old and the new set, nothing has to be done.

For a dynamic graph, whenever the graph changes, the subscriptions on the graph need to be re-evaluated. For simple subscriptions this is only necessary when nodes are removed as they might have to be removed from these simple subscriptions. For graph subscriptions, one can generally not easily determine whether a change on the graph will lead to a change of nodes in the subscription set. Generally, the problem is similar to the problem of materialized view in traditional database systems. Whenever the underlying database system changes the question arises which views need to be recomputed. For our graph system, there are definitely some functions for which one can determine by only looking at the function, whether the result set of the function might be affected by a change of the graph. For instance, the addition or removal of an edge between two nodes is only then relevant for a subscription based on the hopDist function if the current result set contains at least one of these nodes. So far, the proposed middleware implementation makes only basic checks on syntax, but otherwise re-executes graph subscriptions whenever the underlying graph changes. This is equivalent to performing a re-subscription.

In another embodiment, the centralized implementation can be extended to a distributed implementation by considering an overlay network of servers (referred to herein as brokers). There have been several proposals for PUBSUB broker overlays such as PADRES and SIENA, see for example Carzaniga et al. in "Design and Evaluation of a Wide-Area Event Notification System" (ACM trans. Comp. Sys., Vol. 19(3), pp. 332-383). In these distributed PUBSUB systems, brokers form a connected overlay. Each broker has the task of matching all routing messages while being aware only of its neighbour brokers. Clients connect to one of the brokers and can issue their subscription and publication requests to the broker.

A client can only interact with the broker it connects to (referred to herein as edge broker). It should be noted that this is hidden from clients, since they are oblivious of the network topology. The idea is that the load of matching publications to subscriptions and handling message dissemination is shared among the brokers, thus leading to a scalable approach. The idea of having a distributed broker architecture is applied to the proposed graph-based PUBSUB model and discussed further below. For sake of simplicity, in one embodiment, the data structures and message exchanges are based upon those of the PADRES architecture. It should however be understood that other prior art data structures and message exchanges may be employed in addition to new inventive approaches without departing from the scope of the invention.

In an embodiment of the invention, it is assumed that the brokers are fully connected, that is that each broker can communicate with all other brokers in the network. This makes sense as long as the number of brokers remains in the tens or hundreds. Each broker B is in charge of all subscriptions of its local clients and stores them in the tables ST and NST, as described herein above. Furthermore, each broker serves as a proxy client for its local clients to the other brokers. In other words, the other brokers do not know about the clients of B but maintain special broker subscriptions from B on behalf of these clients.

For each node in the graph for which a broker B has at least one local subscription that contains the node, broker B has a subscription for this node at all other brokers. Whenever B receives a first subscription that contains a node with identifier nodeId (that is, the node subscription table NST does not yet have an entry for nodeId), B sends a control message to the other brokers indicating that it now subscribes to nodeId. When B receives a further subscription containing nodeId, it does not need to inform the other brokers as it is already subscribed to the node.

Upon receiving an un-subscription resulting in B having no more subscriptions covering a node, the broker B resends a control message to the other brokers indicating that it is no more subscribing to this node.

When a broker receives a publication on a node from a local client, the broker forwards he publication to all local clients with matching subscriptions as described above. The broker also sends the publication to all other brokers that have a subscription on this node. When a broker receives a publication from another broker, it forwards the publication to all local clients with matching subscriptions as described above.

In order to maintain the information, each broker maintains an additional broker table. For each node in the BT graph for which there is at least one other broker with a subscription, there is an entry (nodeId, [b1, b2, . . . ]) identifying the brokers with subscriptions. Control messages to subscribe to a node are sent by a broker to all other brokers when a new entry for this node is created due to a first local subscription or resubscription on this node. Control messages to unsubscribe from a node are sent by a broker to all other brokers when the entry is removed due to the last local subscription unsubscribing from the node. When a subscription leads to the creation of several new entries in NST, the broker will send a single control message identifying all the new nodes. The enhancements to subscriptions, unsubscriptions, and publications, as well as the handling of control messages according to an embodiment of the invention, are depicted in Algorithm 2 below.

---
Algorithm 2: Distributed GRAPS
---

```
Upon event receiving subscription s from a client c do as in Algorithm 1
    ControlMsg ← φ
    for all nodeId ∈ NI do
        if NST.numberSub(nodeId) == 1 then
            ControlMsg ← ControlMsg ∪ {nodeId}
        end if
    end for
    send subscribe(ControlMsg) to all brokers
end event
Upon event receiving un-subscription with subId do as in Algorithm 1
    ControlMsg ← φ
    for all nodeId ∈ NI do
        if NST.numberSub(nodeId) == 0 then
            ControlMsg ← ControlMsg ∪ {nodeId}
        end if
    end for
    send unsubscribe(ControlMsg) to all brokers
end event
Upon event receiving publisher p for node with nodeId do as in Algorithm 1
    if publication sent by local client then
        Brok.ers ← BT.get.Brok.ers(nodeId)
        for all b ∈ Brok.ers do
            send p to b
        end for
    end if
end event
Upon event receiving subscribe(ControlMsg) or unsubscribe(ControlMsg)
    from broker b do
    for all nodeId ∈ ControlMsg do
        if subscribe then
            BT.add(nodeId,b)
        else
```

-continued

---
Algorithm 2: Distributed GRAPS
---

```
        BT.remove(nodeId,b)
      end if
    end for
end event
```

Although the concept of brokers serving as proxy clients for their own clients and thereby limiting the number of subscriptions that have to be broadcast in the broker network is used in distributed PUBSUB systems, the proposed solution applies the concept to graph subscriptions.

The proposed algorithm is illustrated with the following example. Let b1 and b2 be two brokers of any network and let c1, c2, and c3 be three clients, where broker b1 is the edge broker of clients c1 and c2 and the edge broker of client c3 is b2. Moreover, let g1 be the domain graph of the application. Clients c1 and c2 are assumed to respectively request subscriptions s1=subscribe(g1,[n1,n2]) and s2=subscribe (g1,[hopDist(n1,1)]) and it is assumed that hopDist(n1,1) returns node set {n1,n2,n3}. The non-empty data structures for b1 and their content appear in tables $ST_{B1}$ and $NST_{B1}$ as respectively depicted in Table 1 and Table 2 below. Broker b1 sends a control message to broker b2 for each node broker b1 has a subscription for, resulting in broker b2 updating its table $BT_{B2}$ (see Table 3 below). Now assuming that client c3 wants to publish on node n1, client c3 therefore submits to its edge broker publish(g1,n1,message) and broker b2 uses its table $BT_{B2}$ to forward the message to broker b1 that subsequently forwards it to clients c1 and c2 using its tables $NST_{B1}$ and $ST_{B1}$.

TABLE 1

$ST_{B1}$

| subId | nodeId | Query | Client |
|---|---|---|---|
| sub1 | n1, n2 | s1 | c1 |
| sub2 | n1, n2, n3 | s2 | c2 |

TABLE 2

$NST_{B1}$

| nodeId | subId |
|---|---|
| n1 | [sub1, sub2] |
| n2 | [sub1, sub2] |
| n3 | [sub2] |

TABLE 3

$BT_{B2}$

| nodeId | Broker |
|---|---|
| n1 | [b1] |
| n2 | [b1] |
| n3 | [b1] |

As discussed herein above, several PUBSUB broker systems use advertisements to reduce the amount of subscriptions that have to be sent in the broker network. The idea is that a publisher has to first advertise what it will publish. Then, when a broker receives a local subscription, the broker only has to forward this subscription to the brokers that have a local client that might submit publications that match the subscription.

In GRAPS, an advertisement is simply the announcement of a client to publish on a node:

⟨advertisement⟩::='advertise
    ('⟨graphId⟩','⟨nodeId⟩')'

When a broker receives an advertisement from a local client for node n, the broker keeps track of the advertisement in an advertisement table AT, which is similar to the subscription table ST. Furthermore, the advertisement is forwarded to all brokers if this is the first local advertisement for node n. Similar to the node subscription table NST, each broker also has a node advertisement table NAT. For each node with at least one advertisement, there is an entry (nodeId,[adId1,add2, . . . ],[b1,b2, . . . ]) containing the list of local advertisements on the node as well as the list of remote brokers that have advertisements on this node.

With this, when a broker receives a first subscription on a node n, it forwards the control message to subscribe to n only to those brokers that are listed in the corresponding entry in the NAT. This ensures that the brokers who have publishers on node n know about the subscription. Furthermore, when a broker B receives an advertisement for a node n from another broker B', the broker B checks whether it already has local subscriptions that cover the node n. This can be determined by looking into table NST. If such subscriptions exist, broker B sends back to broker B' a subscription for node n.

Advertisements are useful in the context of the inventive graph models, typically where there is a limited number of clients who publish on any given node. Indeed, this is the case for several of the case studies that have been explored. For instance, in the traffic monitoring application, the control unit client is connected to one of the brokers. Thus, only this broker has a publisher on the nodes of the district and will send the corresponding advertisements. As a result, when cars subscribe to nodes of the district, the subscriptions will only be forwarded to this one broker. Also the social networking application has very localized publishers. For instance, only the members of a group can publish on a node representing a group, and only a person and possibly his/her friends can publish on the node representing the person's page.

It is desirable for each broker to store the graph as it has to evaluate graph subscriptions. Thus, it is desirable for changes to the underlying graph to be propagated to all brokers. Besides that, the challenges for handing updates to the graph in a distributed setting are essentially the same as for the centralized approach. With the exception of subscriptions using specific functions such as hopDist or weightDist, it is desirable for all graph subscriptions to be reevaluated. Luckily, this overhead is now distributed across all edge brokers: upon receiving a graph change, each edge broker reevaluates all its local graph subscriptions, updates its local data structures accordingly, and sends subscription/un-subscription messages to other brokers, if needed.

Figure 4A:
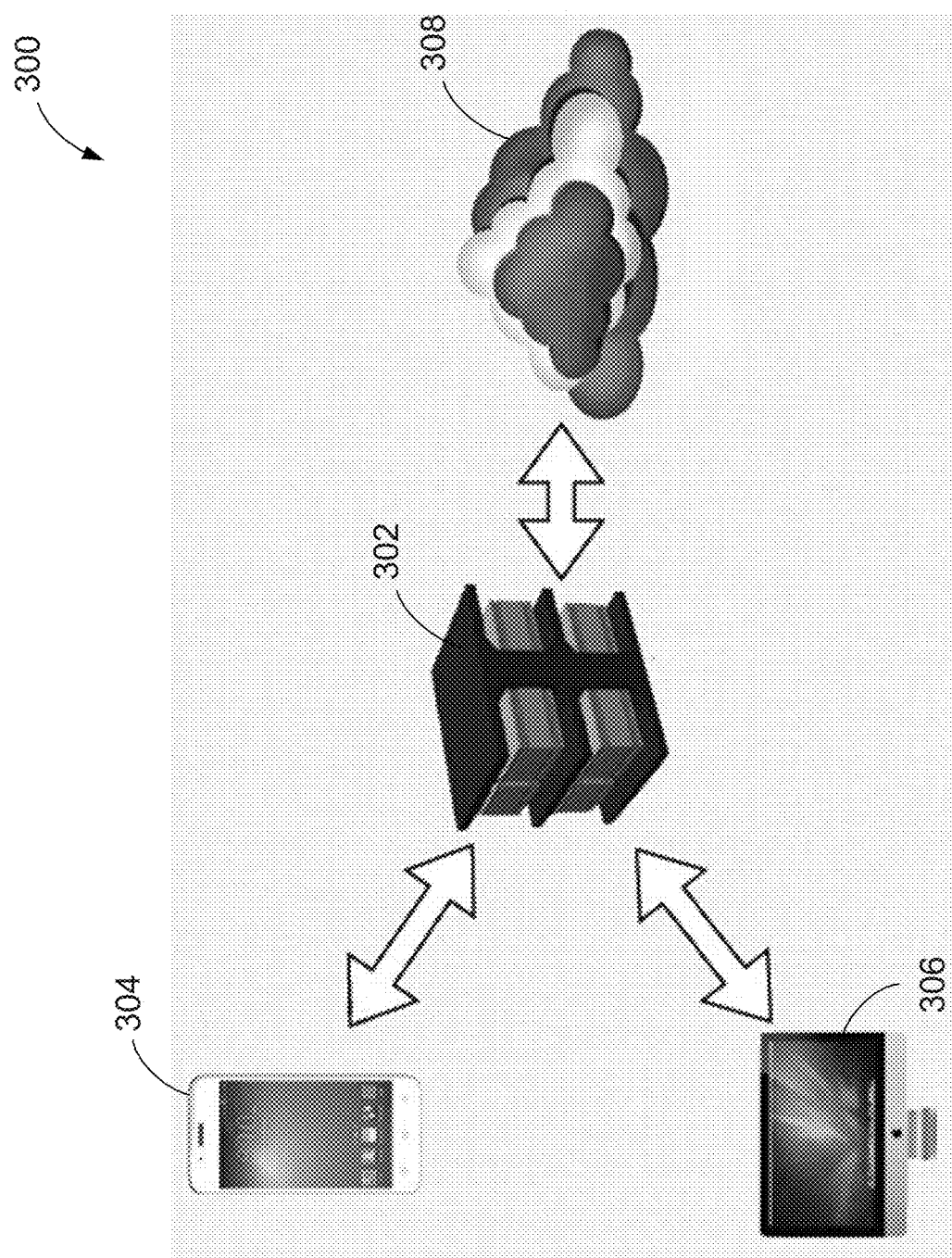
FIG. 4A depicts a Graph-based Publish/Subscribe (GRAPS) architecture, in accordance with an embodiment of the invention.

Referring now to FIG. 4A, an example of a GRAPS architecture 300, in accordance with one embodiment, will now be described. The proposed GRAPS architecture 300 comprises a bridge 302, which interconnects one or more client devices, such as mobile client device 304 and desktop client device 306 (which may each be a publisher or a subscriber), and a backend matching engine 308.

The mobile client device 304 and the desktop client device 306 each comprise a GRAPS client library (not shown), which provides an interface that alleviates the need for software developers to be concerned about communication, message handling, and the like. In particular, the client library provides a user-friendly API that can entirely shield developers from the graph, if desired. In one embodiment, the client library supports push notifications and can be customizable to provide application-specific publications and subscription.

The backend matching engine 308 comprises a first interface (not shown) and a second interface (not shown). The first interface enables for storage and manipulation of graphs while the second interface accepts subscriptions, unsubscriptions (or resubscriptions), and publications. For each incoming publication, the matching subscriptions are identified. In one embodiment, the backend matching engine 308 can scale on demand and be deployed in the Cloud.

The bridge 302 contains a server-side communication module (not shown) that handles communications between the client devices, as in 304, 306, and the graph-based PUBSUB service. Providing the server-side communication module separately from the backend engine 308 makes it easier to handle various types of client devices, including but not limited to mobile and desktop client devices, and communication modes, including but not limited to reliable and unreliable communication modes. In particular, the server-side communication module accepts requests (e.g. graph manipulation, publish, subscribe, unsubscribe) from the client devices as in 304, 306. The server-side communication module of the bridge 302 also implements a push communication paradigm in order to forward responses and publications towards the mobile client devices as in 304. A user-friendly API is also provided at the bridge 302 for graph management.

The bridge 302 also provides support for standard graph queries. In other words, the subscriptions and publications submitted by the client devices 304, 306 can use pre-defined graph functions (such as distance-based queries, as discussed above) and the bridge 302 will automatically transform the subscriptions and publications into the graph queries supported by the underlying graph-based database system. For commonly found graph types (e.g., those representing maps with location information), a richer set of standardized queries (e.g., those relying on the graph having location properties), are offered as plug-ins.

The bridge 302 may be seen as a container, where the graph-based PUBSUB application can further embed application specific code. For instance, if the application wants to use queries that are specific to the application graph, the application can embed its own query transformation code. It should be understood that other application functionality (e.g., login, graph modification etc.) can be integrated into the system. It should also be understood that the bridge 302 may be scaled on demand and deployed in the Cloud.

Figure 4B:
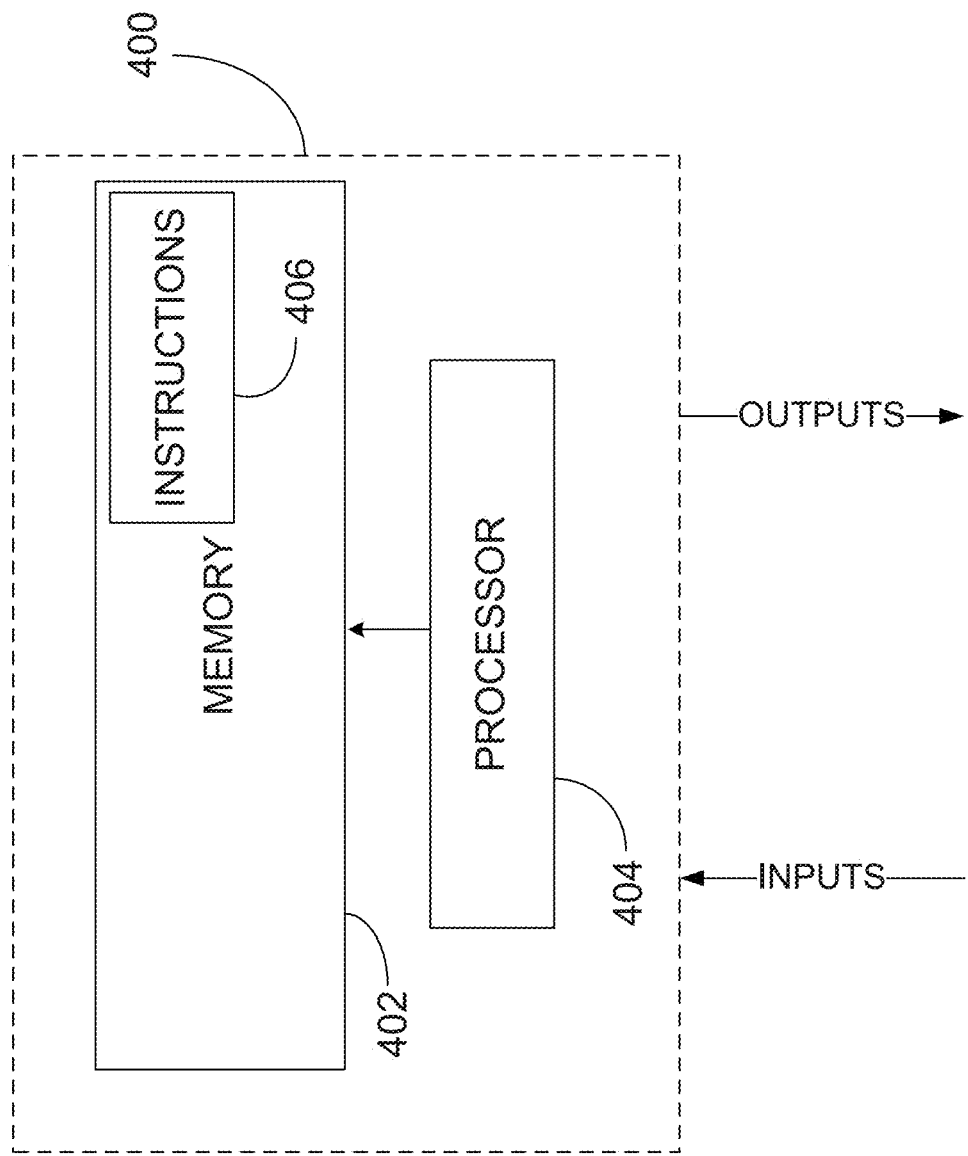
FIG. 4B is a block diagram of an example system for implementing the methods described herein.

Referring to FIG. 4B, the methods described herein may be implemented on one or more computing device(s) 400. Computing device 400 may comprise one or more processors 404 and one or more computer-readable memories 402 storing machine-readable instructions 406 executable by processor 404 and configured to cause processor 404 to generate one or more outputs based on one or more inputs. A bus subsystem may be included for communicating between the components. If the computing device 400 requires a display, such a display may be included, e.g., a liquid crystal display (LCD). If manual data entry is required, the computing device 400 also includes an input device, such as one or more of an alphanumeric input unit such as a keyboard, a pointing control device such as a mouse, and so forth.

Processor 404 may comprise any suitable device(s) configured to cause a series of steps to be performed by computer 400 so as to implement a computer-implemented process such that instructions 406, when executed by computer 400 or other programmable apparatus, may cause the functions/acts specified in the methods described herein to be executed. Processor 404 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 402 may comprise any suitable known or other machine-readable storage medium. Memory 402 may comprise non-transitory computer readable storage medium such as, but not limited to, an electronic, magnetic, optical, electromagnetic, infrared, or semiconductor system, apparatus, or device, or any suitable combination of the foregoing. Memory 402 may include a suitable combination of any type of computer memory that is located either internally or externally to computer 400 such as, for example, random-access memory (RAM), read-only memory (ROM), compact disc read-only memory (CDROM), electrooptical memory, magneto-optical memory, erasable programmable read-only memory (EPROM), and electrically-erasable programmable read-only memory (EEPROM), Ferroelectric RAM (FRAM) or the like. Memory 402 may comprise any storage means (e.g. devices) suitable for retrievably storing machine-readable instructions 406 executable by processor 404.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 402) having computer readable program code (e.g., instructions 406) embodied thereon. The computer program product may, for example, be executed by computer 400 to cause the execution of one or more methods disclosed herein in entirety or in part.

Computer program code for carrying out operations for aspects of the present disclosure in accordance with instructions 406 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 400 or other processing device(s). It is understood that, based on the present disclosure, one skilled in the relevant arts could readily write computer program code for implementing the methods disclosed herein.

Computer-executable instructions 406 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

An initial embodiment of the GRAPS system and method was implemented through extending the distributed content-based PUBSUB middleware PADRES to offer their graph-based subscription language at the interface as well as implement the algorithms described above with reference to the GRAPS middleware. Minor adjustments had to be made to better exploit the internal data structure and communication mechanisms of PADRES. The JGraph (www.jgraph.com) library was used to store and visualize graphs. The graph functions described and presented were implemented using the basic methods provided by this graph library. Additionally, direct calls to some of the functions offered by the library (e.g., Dijkstra's shortest path calculation among two nodes) were allowed.

Two sets of experiments were run on the prototype middleware implementation illustrating the application domains presented above when describing example application domains. All experiments were run on a cluster of approximately one hundred (100) computers. All systems run Linux and have a Gigabit Ethernet connection. Each broker is allocated to one higher-end machine (dual-core processors, 3 GHz, 4 GB Memory), while clients are run on lower-end machines (dual-core processors, 2 GHz, 2 GB memory).

A multiplayer game experiment will now be described. The application domain of this experiment is a massively multiplayer online game (MMOG) where the virtual world is split into tiles. The goal of this experiment is to show that the performance of GRAPS middleware compares favourably with a standard MMOG communication infrastructure.

As described above (with reference to multiplayer gaming), GRAPS provides an intuitive interface that allows players to express their interest in game events in a straightforward way by subscribing to their current tile (node) plus all neighbouring tiles at a certain hop-distance. A standard way of communicating in MMOGs is to use a topic-based PUBSUB engine. The Tile-based Network Engine (TNE) described in Canas et al. and outlined above (when describing multiplayer gaming), for example, creates a topic for each tile. The players calculate the set of tiles that cover their area of interest, and subscribe to each tile (topic) individually. In both systems, GRAPS and TNE, players publish their actions on the tile they currently reside in, and the brokers forward the publication to the interested clients.

Within the implementation, there are two types of publications: position changes when a player moves and sending a full copy of player objects. The latter is needed when a player enters a new area of interest to get a full replica of a player object that was not visible previously. The details of these full copy messages can be quite complex and very game specific, and accordingly, details of these are not provided within this specification as they are handled quite similarly by TNE and GRAPS.

In order to base the experiments on realistic game data, the proposed solution used MAMMOTH, see Kienzle et al. in "MAMMOTH: A Massively Multiplayer Game Research Framework" (Foundations of Digital Games, pp/308-315, ACM Press, 2009), a massive multiplayer game research framework, to record a multiplayer game session with five hundred (500) players in one of the virtual maps MAMMOTH offers. MAMMOTH was configured to use triangular partitioning, and to use as a network engine an implementation of TNE with four fully-connected brokers. Every eight (8) seconds, a new client is started and connects to a randomly chosen broker. Once connected, it would take control of an avatar, and subscribe to all tile topics located up to two (2) hops away from its current tile, and then start moving. Each client stores all its movements in a log, i.e., its current position, to which broker it is connected, and the PUBSUB messages that it generated and received. While the game was running, several metrics were measured on the brokers: their network traffic usage, number of publications and subscriptions received, as well as their CPU and memory usage.

Using the logs, the same experiment was run a second time on top of GRAPS, using four (4) brokers and five hundred (500) clients. The only difference was that instead of sending multiple (un)subscriptions to individual tiles as the players moved, they instead use the corresponding graph subscriptions and re-subscriptions.

Since the experimental setup and scenario were the same, the number of publications position update publications and replica publications used to send the state of a player object to other players when they enter their area of interest were also the same. The differences between the two experiments are shown in FIG. 5 to FIG. 7.

Figure 5:
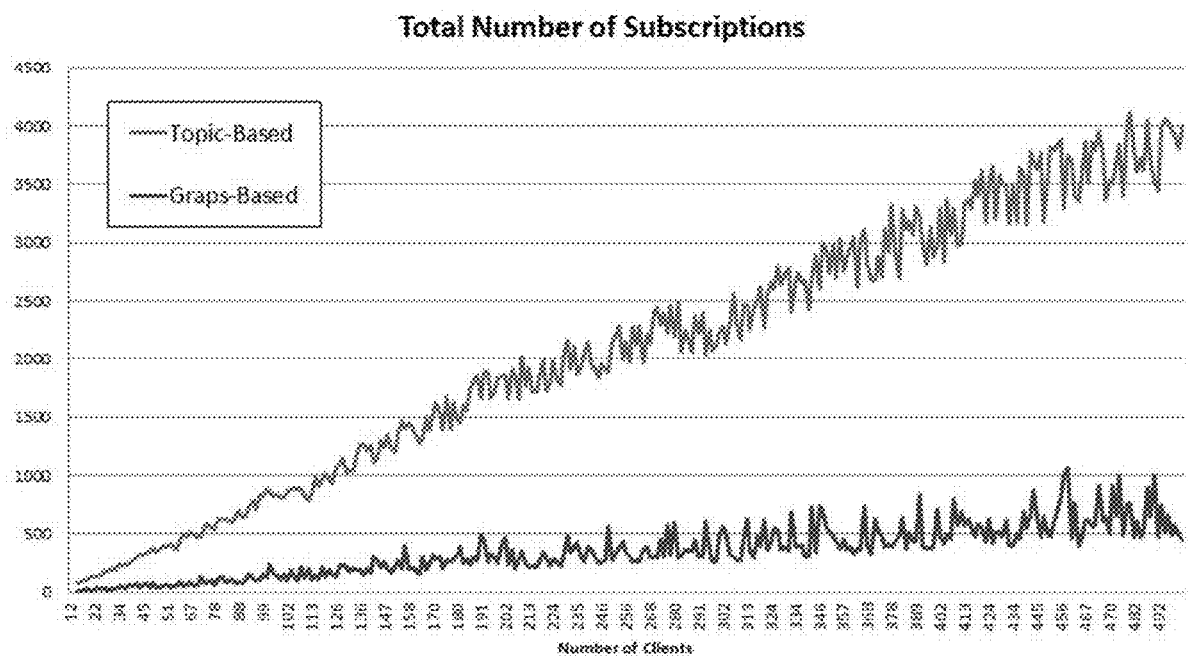
FIG. 5 depicts the total number of subscriptions required when using GR-PUBSUB for a multiplayer gaming instance according to an embodiment of the invention compared to a prior art topic based PUBSUB.

In FIG. 5, it can be seen that the number of subscriptions is higher in the topic-based engine compared to GRAPS. This is to be expected, since a player that moves from one tile (node) to another must subscribe to all new tiles in its area of interest, and un-subscribe from all tiles that are not relevant anymore. In the topic-based system, this involves sending multiple subscription messages, while in GRAPS it only requires sending a single re-subscription message.

Figure 6:
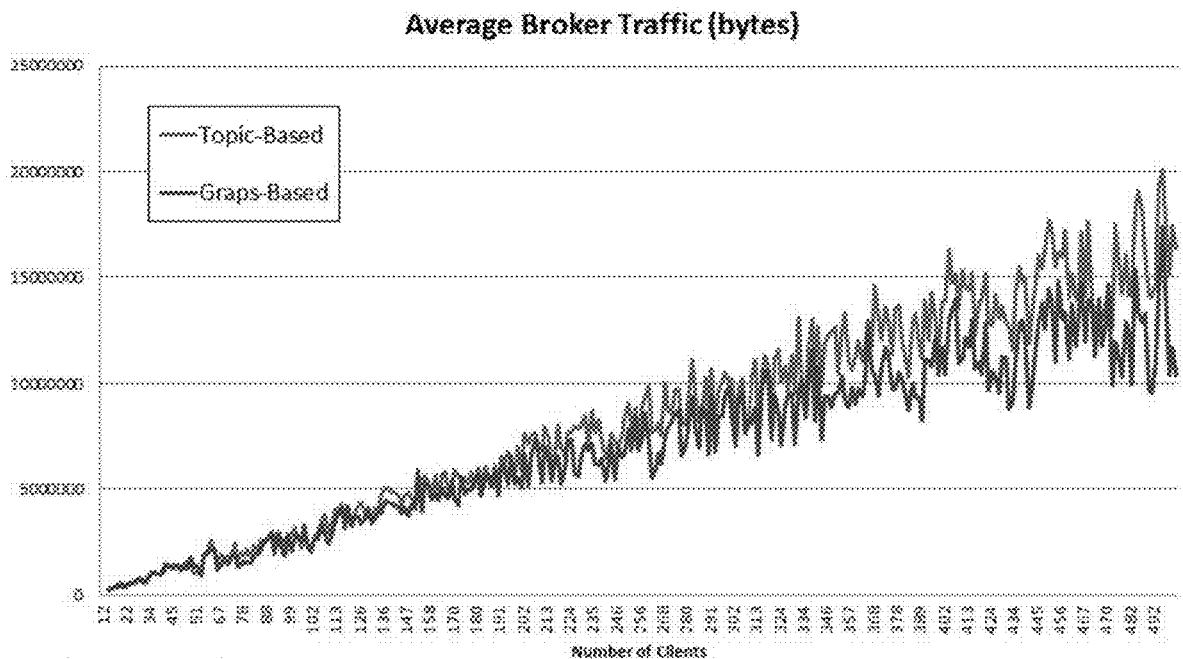
FIG. 6 depicts average broker traffic between brokers within a GR-PUBSUB according to an embodiment of the invention and a prior art topic based PUBSUB.

This has also an effect on the average traffic between brokers as illustrated in FIG. 6. The GRAPS experiment requires less bandwidth, since there are less subscription messages forwarded between brokers in GRAPS. However, the difference in bandwidth usage is not very high. The reason for this is that the size in bytes of the subscription messages is fairly small when compared with the size of the publication messages. In particular the ones that contain a replica object are the biggest contributors to the overall total traffic.

Figure 7:
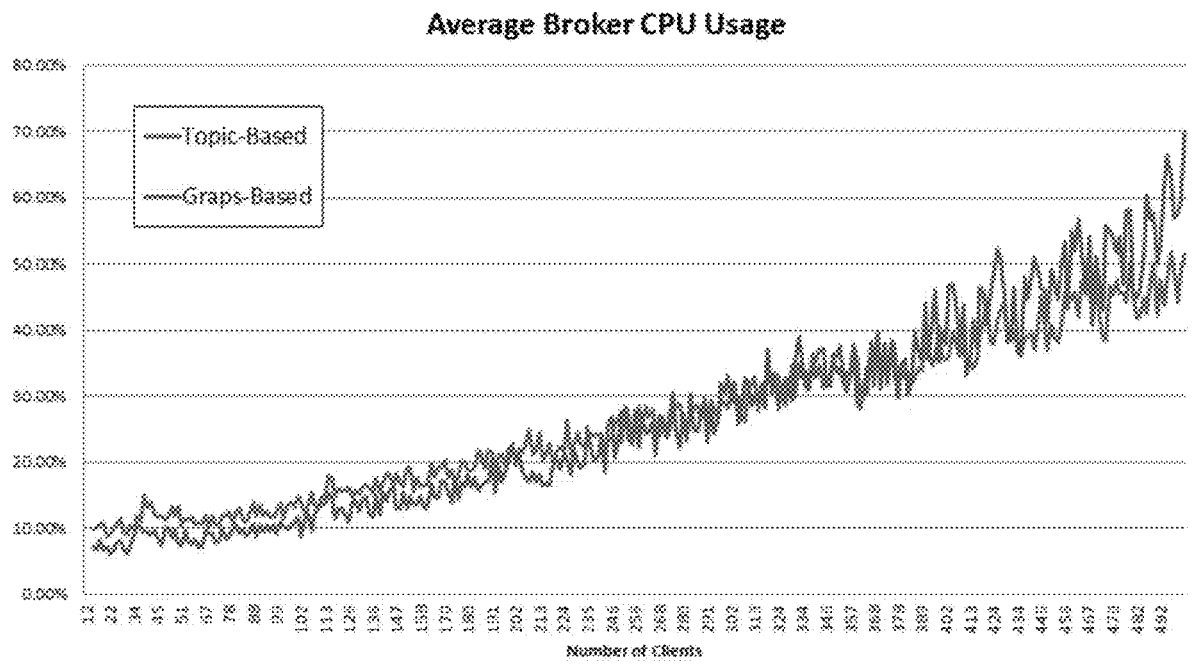
FIG. 7 depicts average broker Central Processing Unit (CPU) usage within a GR-PUBSUB according to an embodiment of the invention and a prior art topic based PUBSUB.

Finally, FIG. 7 shows that the average CPU usage per broker is similar in both systems. The GRAPS system starts out lower, but then increases a little faster than the topic-based one. This behaviour can be explained by the fact that GRAPS calculates, for each graph subscription, the set of nodes that are covered by the subscription. This involves computation on the brokers that in the topic-based system is performed on the clients. Thus, while GRAPS takes over application tasks by offering a rich graph-based subscription language, this leads to computational overhead at the brokers. If this outsourcing to the PUBSUB system is not desired, the graph computations can be performed by the clients which would then only send simple subscriptions to GRAPS. Alternatively, one could consider to outsource complex graph computations to dedicated nodes. However, in mobile gaming applications with wearable devices and the like, offloading processing may be beneficial.

A traffic-monitoring experiment will now be described. The application domain of this experiment is the central traffic monitoring example described above. The goal of the experiment is to show that the proposed implementation of GRAPS can handle a significant number of publications as encountered in such applications.

The proposed experiment is based on a state-of-art simulated traffic experiment which recorded the movements of simulated cars driving in the city of Cologne, Germany as reported by Uppoor et al. in "Generation and Analysis of a Large-Scale Urban Vehicular Mobility Dataset" (Trans. Mobile Computing, Vol. 13(5), pp. 061-1075). The dataset, available at http://kolntrace.project.citi-lab.fr/, contains information about the location (latitude and longitude) and speed of 99,233 cars during a two-hour period of time, from 6:00 am to 8:00 am, covering a region of 400 $km^2$.

Figure 8:
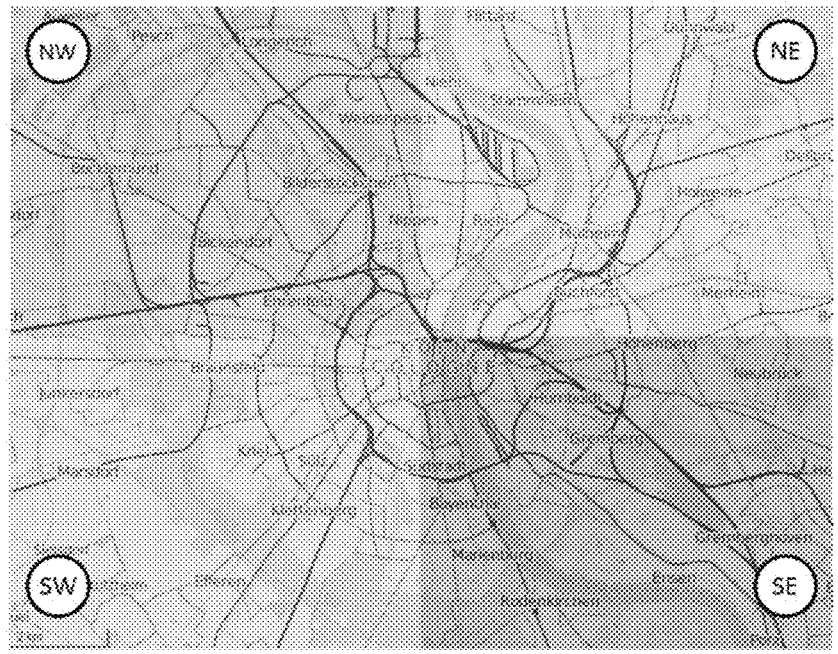
FIG. 8 depicts a segmentation into four district divisions for the city of Cologne within an application of a GR-PUBSUB according to an embodiment of the invention within a traffic monitoring application domain.

The street information for the city of Cologne was obtained from Open Street Maps and used to map the latitude and longitude position information for the cars in the dataset to street segments. The map of Cologne was modelled as a segment-node graph, where road segments are nodes, and two segments are connected if they share a common intersection. The city was also partitioned geographically into four equally large sections (NW, NE, SW, SE), as seen in FIG. 8, and each road segment labelled in the graph with a district attribute to indicate which section the road segment belongs to.

For this experiment, four (4) broker machines and 86 client machines, which simulate the publication traffic generated by the cars (roughly 1,000 cars each), were used. In order to do so, each client connects to a broker, reads the traces for the cars that have been assigned to it, distributes the traces among several internal threads, and schedules the traces to be published in real time (i.e., approximately one publication for each car every five (5) seconds) on the segments. Four (4) traffic control unit clients were also established, one for each district, and each of them residing on a different machine in the laboratory. Each of these clients subscribes to all segments belonging to its district.

Figure 9:
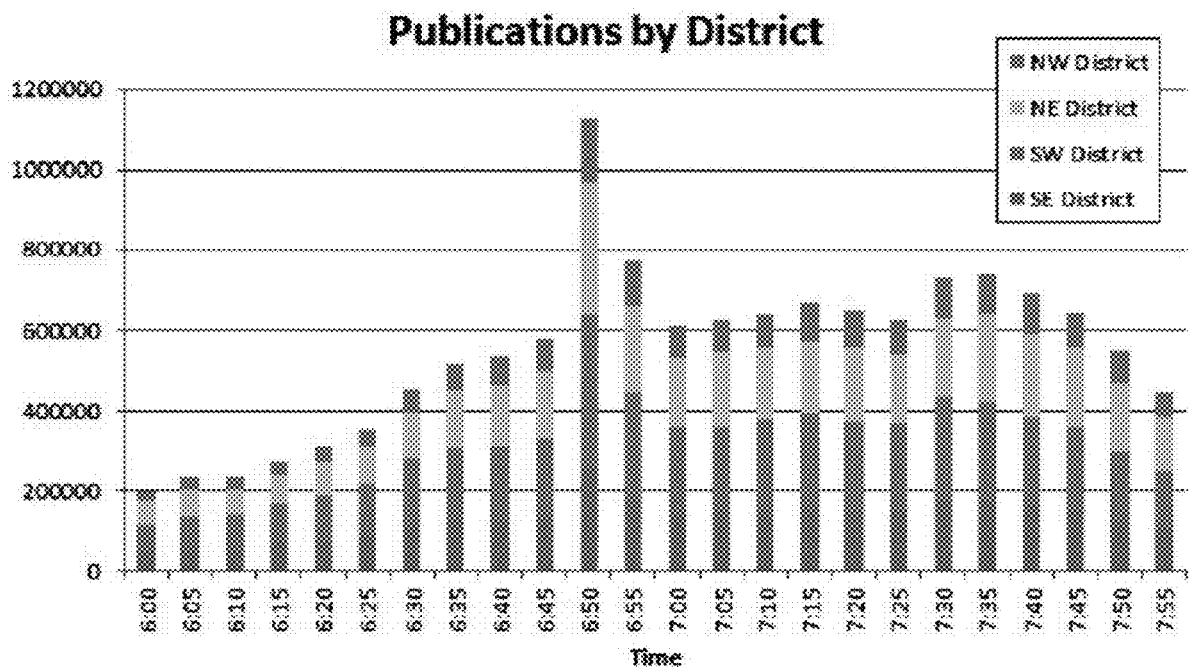
FIG. 9 depicts the total publications per region defined within FIG. 8 within the traffic monitoring application domain exploiting a GR-PUBSUB according to an embodiment of the invention.

By the end of the two-hour experiment, the 99,233 cars distributed across the 86 client machines had published a grand total of 13,220,999 location update messages on 11,785 different segments. Referring to FIG. 9, the total number of publications performed by the clients in 5-minute periods are depicted. The bar segments indicate in which district of the city the publications took place. It can be seen that the traffic is lowest between 6:00-6:05 am, and highest between 6:50-6:55 am, which correspond to 650 and 3800 publications per second, respectively.

Figure 10:
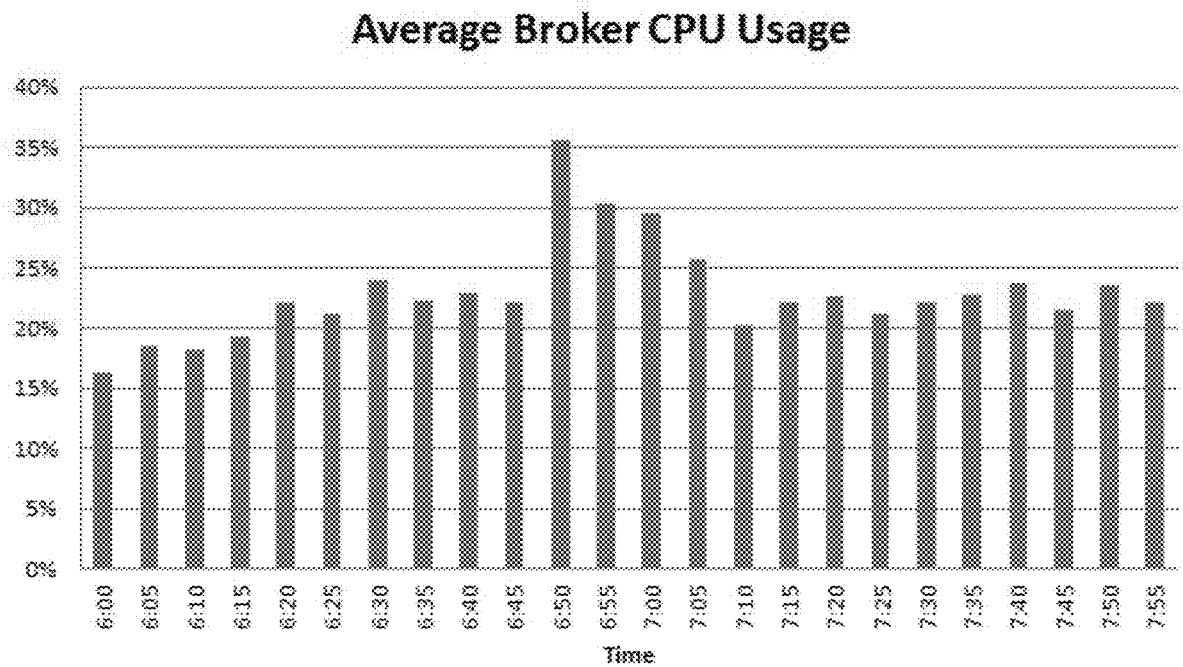
FIG. 10 depicts average CPU usage on four brokers within the traffic monitoring application domain described in respect of FIGS. 8 and 9 with the GR-PUBSUB according to an embodiment of the invention.

FIG. 10 plots the average CPU usage on the four (4) brokers. It can be seen that the system was able to handle the large amount of publications without stressing the computational resources of the brokers. The minimum CPU usage during the experiment is slightly above 16% at the very start. The CPU usage grows and shrinks following the publication load in the system, reaching a maximum 35% CPU usage during the most heavily loaded period of time. This is explained by the fact that the number of subscriptions is constant, and therefore the brokers only need to match the large amount of publications to the few existing subscriptions. Furthermore, for every incoming publication, only one outgoing publication message needs to be sent.

In summary, GRAPS, a novel PUBSUB middleware that provides a graph-based publication/subscription model, has been described herein. One benefit of GRAPS is that, by modelling application domains as graphs and interesting relationships in the application domain as edges, the consumers can empress the semantics of their interest using graph queries that exploit the meaning of the relationships between the nodes encoded in the edges. If the domain changes, the underlying graph can be modified, which as a result brings all active subscriptions automatically up to date. It was then demonstrated how GRAPS can be applied to three example application domains: massively multi-player games, traffic monitoring, and social networks. It should however be understood that these three application domains are exemplary only and that the graph-based publication/subscription model may be applied to a wide range of other applications.

It should also be understood that the embodiments of the graph-based publication/subscription model middleware presented herein are simplified in order to demonstrate the underlying concepts. However, it should be understood that opportunities exist to provide a more elaborate PUBSUB infrastructure exploiting graph-based publication/subscription models. The initial middleware language is quite expressive however, allowing complex query expressions. It should also be understood that a larger set of graph queries than those presented herein may be useful in the context of PUBSUBs and that some might even be application specific.

The general graph-based publication/subscription model allows not only publications on nodes, but also on edges, and even subgraphs if there is a benefit for certain applications. Furthermore, the initial embodiments of the invention execute the graph subscriptions on the broker nodes themselves whereas, optionally, but particularly in the context of cloud services, it is feasible to explore an architecture where this computation is decoupled from message propagation.

Optionally, the internal data structures may be varied and optimized further than the initial demonstrators. For example, within the current architecture, it translates subscriptions directly into node sets when the subscription is submitted. This makes matching publications fast, but the subscriptions have to be re-evaluated whenever the graph changes. Optionally, it may be advantageous to store the subscriptions simply as text, and evaluate them whenever a publication arrives. This, however, appears to require that a fast evaluation. Also, when publications can be on edges or on subgraphs, the data structures will be accordingly more inclusive.

Graph networks have been presented herein that reflect a predetermined portion of the semantics of an application domain comprising a plurality of nodes and a plurality of edges, whereby each edge connects one node of the plurality of nodes with a second node of the plurality of nodes. As discussed herein, a plurality of first attributes can be assigned to the set of edges, wherein each of these attributes further characterizes the relationship between the nodes it connects. Further, a plurality of second attributes can be assigned to the plurality of nodes to further characterize the nodes. Both edges and nodes can have an attribute, referred to as identifier attribute such that the attribute values of these identifier attributes are unique across all edges and respectively all nodes. Accordingly, the nodes, the edges, their relationships, and attributes represent metadata that represents the semantics of the application domain in what is referred to as a "holistic" way, in that the graph method is characterized by not only a more closely interconnected manner than topic-based methods but the graph method also provides for comprehension of the whole application domain.

The grouping of metadata and "meta-information" is stored within the PUBSUB system and may be maintained through an interface wherein nodes and/or their attributes together with edges and/or their attributes can be added, deleted, modified, etc. with relative ease resulting in an evolving graph-based PUBSUB. Further, a subgraph by which it is referred to the union of any subset of nodes of the plurality of nodes and subset of edges connecting nodes in that subset of nodes as a subgraph of the application graph.

Optionally, subgraphs may be deleted and/or added rather than discrete nodes/edges. For example, a first subgraph representing a first application domain, e.g. gaming subscriptions such as Electronic Arts™ FIFA, NHL, NFL, NBA sports games, may be merged with a second subgraph representing a console manufacturer, e.g. Microsoft™, such that, for examples, all nodes along an edge where the subgraphs join are now subscribers to specific Electronics Arts™ games but the edge set joining them is now their subscription as a registered Microsoft™ Xbox™ user.

Another edge set may relate to another console manufacturer or that the user is also a subscriber as a registered Microsoft™ Surface™ user and playing within the cloud.

Within embodiments of the invention described herein, subscriptions are translated to a set of nodes. It should however be understood that subscriptions may be a query over a graph. Accordingly, at any given time and for any given current graph, the subscription-based query translates into a subgraph. For embodiments of the invention where the publications are on nodes, only the nodes of the subgraph will be found to be relevant.

Within embodiments of the invention, publications have been similarly described as being associated with an element within a graph and in a similar manner as that above, the graph model supports expressing in other manners including, for example, that a publication becomes a query over the graph and at the time the queries are sent, they are evaluated on the current graph and then matched against subscriptions. This approach, which is more generalized to that detailed herein, may be beneficial in a range of applications including, but not limited to, e-commerce.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A method for graph-based publication/subscription, the method comprising:
    using a middleware application to minimize a number of messages sent over a network accessible by a plurality of publishers and a plurality of subscribers, the middleware application hosted upon at least one server connected to the network and configured to minimize the number of messages by:
    creating and storing in a database communicatively coupled to the at least one server a graph comprising a plurality of nodes and a plurality of edges, each node representative of a point of interest in an information domain, each edge linking a first one of the plurality of nodes and a second one of the plurality of nodes and representative of a relationship between a first point of interest and a second point of interest in the information domain, the graph representative of a portion of semantics of the information domain;
    receiving, from at least one publisher, a first request to publish content on at least one of at least one selected node and at least one selected edge of the graph;
    receiving, from at least one subscriber, a second request to subscribe to at least one of a subset of the plurality of nodes and a subset of the plurality of edges;
    correlating the first request with the second request to determine whether the subset of the plurality of nodes comprises the at least one selected node and whether the subset of the plurality of edges comprises the at least one selected edge; and
    notifying the content to the at least one subscriber if the subset of the plurality of nodes comprises the at least one selected node and the subset of the plurality of edges comprises the at least one selected edge.

2. The method of claim 1, further comprising one of assigning at least one node attribute to each node and assigning at least one edge attribute to each edge, wherein a value of the at least one node attribute and a value of the at least one edge attribute change over time.

3. The method of claim 2, wherein the at least one edge attribute comprises at least one of an edge type and an edge weight, the edge type indicative of a relationship between the first one of the plurality of nodes and the second one of the plurality of nodes linked by each edge, and the edge weight indicative of a degree of relatedness between the first one of the plurality of nodes and the second one of the plurality of nodes.

4. The method of claim 2, wherein the at least one node attribute is a unique identifier associated with each node.

5. The method of claim 1, wherein receiving the second request comprises receiving an identification of the subset of the plurality of nodes as of interest to the at least one subscriber.

6. The method of claim 2, wherein receiving one of the first request and the second request comprises receiving a graph query comprising at least one parametrized function operative on the graph, evaluating the at least one parametrized function, and determining the at least one of the at least one selected node and the at least one selected edge or the at least one of the subset of the plurality of nodes and the subset of the plurality of edges accordingly.

7. The method of claim 6, wherein the graph query is received as comprising the at least parametrized function comprising one of a distance function, a hop distance function, a shortest path function, and a selection of values for the at least one node attribute and the at least one edge attribute.

8. The method of claim 2, further comprising, in response to a change in the information domain:
    dynamically modifying the graph comprising at least one of adding one or more nodes, removing one or more nodes, adding one or more edges, removing one or more edges, modifying the at least one node attribute of one or more nodes, and modifying the at least one edge attribute of one or more edges; and
    reevaluating one or more subscriptions to the graph accordingly.

9. The method of claim 1, further comprising:
    receiving, from the at least one subscriber, a third request to subscribe to at least one of a new subset of the plurality of nodes and a new subset of the plurality of edges; and
    modifying at least one of the subset of the plurality of nodes and the subset of the plurality of edges to match the at least one of the new subset of the plurality of nodes and the new subset of the plurality of edges, thereby replacing an existing subscription associated with the second request with a new subscription associated with the third request.

10. The method of claim 1, wherein the first request is indicative of a request to publish content on a subgraph formed as a union of selected ones of the plurality of nodes and selected ones of the plurality of edges, wherein the second request is correlated with the first request to determine whether the subset of the plurality of nodes and the subset of the plurality of edges overlap the subgraph, and wherein the content is notified to the at least one subscriber if the subset of the plurality of nodes and the subset of the plurality of edges overlap the subgraph.

11. A system for graph-based publication/subscription, the system comprising:
- a processing unit;
- a non-transitory memory communicatively coupled to the processing unit; and
- middleware application stored in the memory and comprising computer-readable program instructions executable by the processing unit for minimizing a number of messages sent over a network accessible by a plurality of publishers and a plurality of subscribers by:
  - creating and storing in a database a graph comprising a plurality of nodes and a plurality of edges, each node representative of a point of interest in an information domain, each edge linking a first one of the plurality of nodes and a second one of the plurality of nodes and representative of a relationship between a first point of interest and a second point of interest in the information domain, and the graph representative of a portion of semantics of the information domain,
  - receiving, from at least one publisher, a first request to publish content on at least one of at least one selected node and at least one selected edge of the graph,
  - receiving, from at least one subscriber, a second request to subscribe to at least one of a subset of the plurality of nodes and a subset of the plurality of edges,
  - correlating the first request with the second request to determine whether the subset of the plurality of nodes comprises the at least one selected node and whether the subset of the plurality of edges comprises the at least one selected edge, and
  - notifying the content to the at least one subscriber if the subset of the plurality of nodes comprises the at least one selected node and the subset of the plurality of edges comprises the at least one selected edge.

12. The system of claim 11, wherein the instructions are executable by the processing unit for one of assigning at least one node attribute to each node and assigning at least one edge attribute to each edge, wherein a value of the at least one node attribute and a value of the at least one edge attribute change over time.

13. The system of claim 12, wherein the instructions are executable by the processing unit for assigning the at least one edge attribute comprising at least one of an edge type and an edge weight, the edge type indicative of a relationship between the first one of the plurality of nodes and the second one of the plurality of nodes linked by each edge, and the edge weight indicative of a degree of relatedness between the first one of the plurality of nodes and the second one of the plurality of nodes.

14. The system of claim 11, wherein the instructions are executable by the processing unit for receiving the second request comprising receiving an identification of the subset of the plurality of nodes as of interest to the at least one subscriber.

15. The system of claim 12, wherein the instructions are executable by the processing unit for receiving one of the first request and the second request comprising receiving a graph query comprising at least one parametrized function operative on the graph, evaluating the at least one parametrized function, and determining the at least one of the at least one selected node and the at least one selected edge or the at least one of the subset of the plurality of nodes and the subset of the plurality of edges accordingly.

16. The system of claim 15, wherein the instructions are executable by the processing unit for receiving the at least parametrized function comprising one of a distance function, a hop distance function, a shortest path function, and a selection of values for the at least one attribute and the at least one edge attribute.

17. The system of claim 12, wherein the instructions are executable by the processing unit for, in response to a change in the information domain:
- dynamically modifying the graph comprising at least one of adding one or more nodes, removing one or more nodes, adding one or more edges, removing one or more edges, modifying the at least one node attribute of one or more nodes, and modifying the at least one edge attribute of one or more edges; and
- reevaluating one or more subscriptions to the graph accordingly.

18. The system of claim 11, wherein the instructions are executable by the processing unit for:
- receiving, from the at least one subscriber, a third request to subscribe to at least one of a new subset of the plurality of nodes and a new subset of the plurality of edges; and
- modifying at least one of the subset of the plurality of nodes and the subset of the plurality of edges to match the at least one of the new subset of the plurality of nodes and the new subset of the plurality of edges, thereby replacing an existing subscription associated with the second request with a new subscription associated with the third request.

19. The system of claim 11, wherein the instructions are executable by the processing unit for receiving the first request indicative of a request to publish content on a subgraph formed as a union of selected ones of the plurality of nodes and selected ones of the plurality of edges, correlating the second request with the first request to determine whether the subset of the plurality of nodes and the subset of the plurality of edges overlap the subgraph, and notifying the content to the at least one subscriber if the subset of the plurality of nodes and the subset of the plurality of edges overlap the subgraph.

20. A non-transitory computer readable medium having stored thereon program instructions executable by a processor for:
- creating and storing in a database a graph comprising a plurality of nodes and a plurality of edges, each node representative of a point of interest in an information domain, each edge linking a first one of the plurality of nodes and a second one of the plurality of nodes and representative of a relationship between a first point of interest and a second point of interest in the information domain, and the graph representative of a portion of semantics of the information domain and configured for minimizing a number of messages sent over a network accessible by a plurality of publishers and a plurality of subscribers;
- receiving, from at least one publisher, a first request to publish content on at least one of at least one selected node and at least one selected edge of the graph;
- receiving, from at least one subscriber, a second request to subscribe to at least one of a subset of the plurality of nodes and a subset of the plurality of edges;
- correlating the first request with the second request to determine whether the subset of the plurality of nodes comprises the at least one selected node and whether the subset of the plurality of edges comprises the at least one selected edge; and notifying the content to the at least one subscriber if the subset of the plurality of nodes comprises the at least one selected node and the subset of the plurality of edges comprises the at least one selected edge.

* * * * *